US 9,979,904 B2

(12) United States Patent
Dominguez Castro et al.

(10) Patent No.: US 9,979,904 B2
(45) Date of Patent: May 22, 2018

(54) ADVANCED REGION OF INTEREST FUNCTION FOR IMAGE SENSORS

(71) Applicant: Innovaciones Microelectrónicas S.L. (Anafocus), Sevilla (ES)

(72) Inventors: Rafael Dominguez Castro, Sevilla (ES); Sergio Morillas Castillo, Sevilla (ES); Rafael Romay Juárez, Sevilla (ES); Fernando Medeiro Hidalgo, Sevilla (ES)

(73) Assignee: INNOVACIONES MICROELECTRÓNICAS S.L. (ANAFOCUS), Seville (ES)

( * ) Notice: Subject to any disclaimer, the term of this patent is extended or adjusted under 35 U.S.C. 154(b) by 0 days. days.

(21) Appl. No.: 14/763,422

(22) PCT Filed: Jan. 24, 2014

(86) PCT No.: PCT/EP2014/051390
§ 371 (c)(1),
(2) Date: Jul. 24, 2015

(87) PCT Pub. No.: WO2014/114741
PCT Pub. Date: Jul. 31, 2014

(65) Prior Publication Data
US 2015/0358571 A1    Dec. 10, 2015

(30) Foreign Application Priority Data

Jan. 25, 2013 (EP) .................................... 13152740
Jan. 25, 2013 (EP) .................................... 13152741

(51) Int. Cl.
*H04N 5/335* (2011.01)
*H04N 5/345* (2011.01)
(Continued)

(52) U.S. Cl.
CPC ............. *H04N 5/345* (2013.01); *H04N 5/378* (2013.01); *H04N 5/37452* (2013.01)

(58) Field of Classification Search
CPC ........................... H04N 5/345; H04N 5/37452
See application file for complete search history.

(56) References Cited

U.S. PATENT DOCUMENTS 6,486,912 B1    11/2002   Aizawa et al.
7,492,398 B1     2/2009   Norita et al.
(Continued)

FOREIGN PATENT DOCUMENTS

EP    1686789 A1    8/2006
EP    2538665 A1   12/2012
(Continued)

OTHER PUBLICATIONS

Notification of Reasons for Refusal Issued in Japanese Patent Application No. 2015-554155 dated Nov. 14, 2017 and English Translation Thereof, 14 pages.
(Continued)

*Primary Examiner* — Gary C Vieaux
(74) *Attorney, Agent, or Firm* — Troutman Sanders LLP

(57) ABSTRACT

The present invention relates to reading-out sensor array pixels. In particular, the present invention provides an approach according to which only a region of interest is may be read out from the sensor array, thus leading to substantial time savings. In order to achieve this, a circuitry for configuring a region of interest for the sensor array is provided as well as a reading-out circuitry for reading-out pixels belonging to the region of interest. In addition, the corresponding methods for programming the region of interest and for reading-out the region of interest are provided. The circuitry for programming and/or reading-out the region of interest includes per pixel provided storage elements for
(Continued)

storing an indication of whether a pixel belongs to a region of interest (ROI). These are configured by the programming circuitry and using when reading-out the ROI for only reading out the pixels of the ROI.

15 Claims, 19 Drawing Sheets

(51) Int. Cl.
  *H04N 5/378* (2011.01)
  *H04N 5/3745* (2011.01)

(56) References Cited

U.S. PATENT DOCUMENTS

| | | | |
|---|---|---|---|
| 7,551,203 B2 | 6/2009 | Nakayama et al. | |
| 7,920,170 B2 | 4/2011 | Sonoda | |
| 2003/0140212 A1* | 7/2003 | Stein | G06F 15/8007 712/22 |
| 2004/0095492 A1 | 5/2004 | Baxter et al. | |
| 2004/0141067 A1 | 7/2004 | Nakayama et al. | |
| 2004/0227828 A1 | 11/2004 | Loose | |
| 2008/0226170 A1 | 9/2008 | Sonoda | |
| 2009/0066782 A1 | 3/2009 | Choi et al. | |

FOREIGN PATENT DOCUMENTS

| | | |
|---|---|---|
| JP | H11-275468 A | 10/1999 |
| JP | 2003-526231 A | 9/2003 |
| JP | 2003-304451 A | 10/2003 |
| JP | 2004-180240 A | 6/2004 |
| JP | 2008228232 A | 9/2008 |
| JP | 2010282135 A | 12/2010 |
| JP | 2012-129709 A | 7/2012 |
| WO | 00/51345 A1 | 8/2000 |
| WO | 03/081899 A1 | 10/2003 |
| WO | 2006/008553 A1 | 1/2006 |
| WO | 2007/136764 A2 | 11/2007 |

OTHER PUBLICATIONS

Notification of Reasons for Refusal Issued in Japanese Patent Application No. 2015-554156 dated Nov. 21, 2017 and English Translation Thereof, 8 pages.

* cited by examiner

☐ Pixel without information
▨ Pixel with information

Row-by-row download
process of the pixel array

Total download time:
$3T_{row}+13T_{row}=16T_{row}$

▫ Pixel without information
▨▨▨ Pixel with information

400A, Pixel array
420, ROI=entire area
431, ROI #1
432, ROI #2
433, ROI #3
ROI #45
ROI #46

Row-by-row download process of the pixel array
Total time: 46 $T_{row}$

Download process of the pixel array
Total time: 3 $T_{row}$

ADVANCED REGION OF INTEREST FUNCTION FOR IMAGE SENSORS

CROSS REFERENCE TO RELATED APPLICATIONS

The present application is the U.S. National Phase of International Patent Application Serial No. PCT/EP2014/051390 filed on Jan. 24, 2014, which claims priority to European Patent Application Serial No. 13152741.8 and European Patent Application Serial No. 13152740.0, both of which were filed on Jan. 25, 2013. The contents of the foregoing applications are hereby incorporated by reference in their entireties.

The present invention relates to reading out data from image sensors. In particular, the present invention relates to reading-out areas from the image sensors.

THE BACKGROUND OF THE INVENTION

Many popular consumer electronics applications such as cameras and mobile handsets as well as professional electronic applications such as laser-triangulation, video surveillance, monitoring employ complimentary metal oxide semiconductor (CMOS) image sensors. Various applications pose different requirements on the spatial and temporal resolution. In general as sensor resolution increases, the operation of the sensors in desired frame rates involves higher data reading-out rates.

FIG. 1 illustrates a typical CMOS image sensor. The CMOS image sensor includes a pixel area 100 which comprises a matrix of N×M elements called pixels, N being the number of columns and M being the number of rows. Each pixel comprises a photosensitive region for accumulating incoming light energy in the form of electric charge and some transistors employed for controlling the pixel operation and for downloading the information from the pixel to the memory element typically placed at the bottom of a column. The photosensitive region may be for instance a photodiode.

The CMOS image sensor of FIG. 1 further comprises a row selection circuit 101 for driving the control signals to the pixels in the sensor area using horizontal control lines 102. The control signals may be applied to all pixels at the same time or to all pixels in a single row of the area. Accordingly, the signals may be global control signals or local control signals respectively. The local control signals are applied to one pixel row and then the same control signals are applied to another (for instance subsequent) pixel row, etc. Moreover, solutions are possible in which multiple rows are selected by the local control signals. For instance, high speed modern CMOS image sensors usually work using a "global shutter" operation. In this operation mode, the image sensing is performed in all pixels at the same time. Accordingly, the row selection circuit 101 applies the sequence of control signals activating image sensing to all pixel rows at the same time. In the past and in case of less speed demanding applications, the download of the pixels from the area is performed sequentially in a row by row basis or sequentially block by block, wherein a block includes multiple rows.

Furthermore, the CMOS image sensor includes typically a read-out channel (read-out circuit) 105. The read-out channel sequentially (row by row) receives the information contained in the pixels of each sensor row via the data column lines 103 and processes the data read. Modern CMOS image sensors typically include within the processing performed by the read-out channel also the operations of amplification and digitalization of the pixel information. After the processing, pixel information is transmitted from the sensor via output ports.

In compliance with the above description, the download of the pixel area is performed row by row driven by the row selection circuit. In a more sophisticated sensor, the row selection circuit may by capable to start in a row different from the first one and/or may skip some rows. This enables defining and downloading multiple regions of interest (ROI) separately and separated from several rows without wasting time due to downloading undesired rows. Nevertheless, since the control signals are propagated horizontally (row-wise) it is only possible to download a horizontal region of interest consisting of one or multiple full rows (complete rows).

FIG. 2 illustrates an example of an image sensor including two regions of interest and an effective read out process capable of skipping empty rows. In particular, FIG. 2 shows a pixel area 200 with a first region of interest 201 and the second region of interest 202. As can be seen, the first and the second regions of interest 201, 202 are both formed by multiple of entire rows. This is appropriate for the second region of interest in which all pixels 212 carry information which is needed to be downloaded. However, in the case of the first region of interest 201, only pixels 211 include the information which is needed to be downloaded. Accordingly, the remaining pixels of the first region of interest 201 are downloaded even if they are not needed since they don't carry any relevant information. This is illustrated in the bottom part of FIG. 2 showing the row by row download process of the pixel area 200 based on the two regions of interest 201 and 202. At first, the three rows corresponding to region of interest 202 are downloaded. Then, the 13 rows corresponding to the first region of interest 201 are now molded. Accordingly, assuming that the time $T_{row}$ is the time necessary for downloading one row, the total download time for the two regions of interest 201 and 202 will be $3 \times T_{row} + 13 \times T_{row} = 16 \times T_{row}$.

Indeed, in the present example since the pixel area 200 includes 46 rows, downloading only 16 of them speeds up the application considerably. However, there are applications in which the read out speed is essential and in which the regions of interest do not have rectangular shapes. In such cases, even with this approach, many unnecessary pixels are downloaded.

Moreover, there are many applications in which the ROI changes from image to image and which, at the same time, require a very high speed, which is habitually limited by the time required to read the information out of the sensor.

One typical example for this type of application is laser triangulation. Laser triangulation application is illustrated in FIGS. 3A and 3B. Laser triangulation includes monitoring a reflected structured laser light projected over an object which is located or moving in front of the camera.

Usually, the structured laser light is shaped as a single line. The laser triangulation is used to determine a distance to an object and/or structure of an object. For instance, the laser triangulation may be used for three dimensional scanning of the object. FIG. 3A shows a schematic principle of laser triangulation 310 in which an object 311 is illuminated by a laser source 312 of a scanning device 315. The laser produces a beam 313 which is reflected from the object 311 and the reflected beam 314 is detected by a sensor 316.

Laser scanning of a three dimensional object 320 is also illustrated in FIG. 3B. The possible results of the scanning are shown in images 330 and 340 respectively. As can be seen from the exemplary reflection images 330 and 340, the images are almost empty except for a thin white line corresponding to the reflected laser line of which the shape is distributed along the pixel area. For instance, in the images 330 and 340 the minimum rectangular region of interest necessary to download the laser line has a vertical size almost as tall as the entire pixel area whereas the percentage of pixels with the relevant information (the line) is very small.

In the example above, the image 330 is almost empty (dark) except for the thin white (bright) line corresponding to the reflected laser line whose shape is distributed along the pixel array. In an image like this, the minimum rectangular ROI necessary to download the laser line is almost as tall as the entire pixel array whereas the percentage of the pixels with relevant information (pixels of the reflected line) is very small.

SUMMARY OF THE INVENTION

Some applications of laser triangulation consist of detecting a certain profile whose position in the pixel array is previously known in all captured images and confirming that its shape and dimensions meet certain specifications. Such applications may be, for instance a cable inspection or any other kind of deformation or deterioration detection. In this case, a static, a priori definition of a non-rectangular ROI could deliver a huge benefit.

On the other hand, there are other applications, in which a 3D reconstruction of an object with an arbitrary shape is aimed. Hence, there is no knowledge about the ROI in advance, and it is required to calculate it in real time for each image since it can change from frame to frame.

A problem underlying the present invention is based on the observation that especially in some applications only a rather small portion of the entire pixel area is necessary to be downloaded and that this portion is not necessarily of a rectangular shape covering entire rows. Moreover, the portion including the relevant data may change with the time.

Accordingly, the aim of the present invention is to provide an approach which would enable for reading out pixels from a pixel area in a more efficient way and in particular enabling the faster download of the pixels including the relevant information.

The present invention provides an architecture which, when embedded in a CMOS sensor, allows the sensor to calculate the appropriate ROI for every image acquired and read-out such image using that ROI, thus minimizing the amount of data to be readout, thereby increasing the frame rate.

This is achieved by the subject matter of the independent claims.

Advantages and embodiments of the invention are subject to the dependent claims.

It is the particular approach of the present invention to speed up the downloading of the image from a pixel area by enabling selectively downloading only the pixels contained in a region of interest whose geometry can be randomly defined over the pixel area.

According to an aspect of the present invention, a circuitry is provided for configuring a region of interest, ROI, within pixels of a sensor array, the ROI including one or more pixels to be read-out from the sensor array. The circuitry comprises a ROI storage means for storing a ROI indication indicating that a pixel belongs to the region of interest of the sensor array; and a control means for writing into the ROI storage means of the pixel the ROI indication.

In accordance with an advantageous embodiment of the present invention, the ROI storage means is a one-bit memory provided per pixel and having an input for receiving a ROI writing signal and an input for receiving a ROI configuration signal from the control means.

The control means preferably comprises a selection circuit for generating the ROI write signal and a ROI programming circuit for generating the ROI configuration signal; and the ROI storage means is configured to store a ROI configuration signal value upon receiving the ROI writing signal and the ROI storage means is configured to store a first value when the pixel is a first pixel belonging to ROI within a line of pixels and to store a second value, different from the first value otherwise.

According to another aspect of the present invention, a read-out circuitry is provided for reading-out from a sensor array a region of interest, ROI, including one or more pixels. The read-out circuitry comprises a signal storage means for storing per pixel a signal detected by the sensor; a ROI storage means for storing a ROI indication indicating that a pixel belongs to the region of interest of the sensor array; a selection circuit for selecting at least one pixel to be read-out, the selection circuit being configured to select only pixels with the ROI indication indicating that said pixels belong to the region of interest; and a read-out circuit for reading-out the signal storage means of the selected pixels.

In accordance with an advantageous embodiment of the present invention, the read-out circuitry includes a shift register including an input for receiving a signal from a ROI storage means of another pixel preceding said pixel within a line of pixels; an input for receiving a signal from the ROI storage means; and an output for shifting a signal received to a ROI storage of another pixel following said pixel within the line of pixels and to the selection circuit, wherein the selection circuit is configured to select the pixels in accordance with the signal input from the shift register, the ROI storage means is configured to store a first value when the pixel is a first pixel belonging to ROI within a line of pixels and to store a second value, different from the first value otherwise, and the shift register is configured to perform the shifting a predetermined number of times.

Preferably, the circuitry further comprises a bypass storage means for storing a bypass indication for a pixel indicating by a predefined value that said pixel is to be skipped during reading-out, the shift register includes an input for receiving a bypass signal corresponding to the bypass indication; and the shift register is configured to transfer the signal from a ROI storage means of the previous pixel to the output upon receiving the bypass signal with the predefined value.

Advantageously, the ROI indication is one bit long, the ROI indication takes a first value for the first pixel in a column of the sensor array which belongs to the region of interest and a value different from the first value for all other pixels in said column, and the circuitry comprises a counter storage for storing an indicator of the number of pixels in said column belonging to ROI.

For instance, the circuitry's counter storage is adapted to store the indicator of the number of pixels in the column belonging to ROI for each column separately or commonly for all columns of the sensor area.

According to an aspect of the present invention, an apparatus is provided for image sensing comprising: the read-out circuitry as described above connectable to a sensor array matrix including a plurality of pixels; the circuitry as described above for configuring a region of interest, ROI, within the sensor array matrix; write data lines connecting pixels of the sensor array matrix with the circuitry for configuring ROI, and selection lines connecting pixels of the sensor array matrix with the selection circuit; and signal data lines connecting pixels of the sensor array matrix with the read-out circuitry.

Moreover, according to an embodiment of the present invention, an apparatus is provided for triangulation including: a light source for irradiating an object by means of a laser beam; and the apparatus according to claim 8 for sensing the light reflected from the irradiated object.

An advantageous implementation of the present invention provides an integrated circuit implementing any of the circuitry embodiments mentioned above.

According to another aspect of the present invention, a method is provided for configuring a region of interest, ROI, within pixels of a sensor array, the ROI including one or more pixels to be read-out from the sensor array. The method comprises the following steps performed for one pixel: generating a ROI write signal and providing the generated ROI write signal to the pixel; upon receiving the ROI writing signal, writing into the ROI storage means of the pixel a ROI indication indicating that a pixel belongs to the region of interest of the sensor array.

According to another aspect of the present invention, a method is provided for reading-out from a sensor array a region of interest, ROI, including one or more pixels and comprising the steps of for selecting at least one pixel to be read-out, the selection circuit being configured to select only pixels with a predefined value of a ROI indication stored per pixel and indicating that said pixel belongs to the region of interest of the sensor array; and reading-out a signal from the selected pixels.

Preferably, the method includes a first reading-out from each column the first pixel belonging to the region of interest, shifting the ROI indication values of the pixels read-out to the respective pixels following the read-out pixels in their respective columns thus extending the region of interest, wherein the shifting is performed a predetermined number of times, storing for each read-out pixel the ROI indication values of the respective pixels preceding the read-out pixels in their respective columns, and a second reading-out from each column the first pixel belonging to the redefined region of interest.

Advantageously, the method further comprises determining a bypass signal for a pixel, specifying by a predefined value that said pixel is to be skipped during reading-out; and transferring the signal from the ROI storage means of the previous pixel to the output upon detecting the bypass signal with a predefined value.

In accordance with an embodiment of the present invention, the method includes sensing with all pixels of the sensor array at the same time for a predefined exposure time period; and reading-out sequentially portions of the region of interest including respectively i-th pixel belonging to the region of interest in each of the sensor array columns, i being an integer from 1 to N, N being an integer denoting the number of pixels in a column belonging to the region of interest.

The above and other objects and features of the present invention will become more apparent from the following description and preferred embodiments given in conjunction with the accompanying drawings in which:

FIG. 1 is a block diagram for CMOS image sensor,

FIG. 2 is a schematic drawing illustrating an example of an image sensor containing two regions of interest and a reading process skipping empty rows, FIGS. 3A and 3B are schematic drawings illustrating laser triangulation sensor and corresponding example of a reflection image, FIG. 4 is a schematic drawing illustrating a sensor read-out process of the prior art in comparison with the process according to the present invention, FIG. 5 is a circuit diagram illustrating an example of a five-transistor pixel architecture, FIG. 6 is a schematic drawing illustrating a time diagram of a row-by-row reading-out and exposure for the entire sensor array, FIG. 7 is a circuit diagram illustrating the five-transistor pixel architecture of FIG. 5 modified in accordance with an embodiment of the present invention, FIG. 8 is a schematic drawing illustrating steps of serially programming the region of interest for each column, FIG. 9 is a schematic drawing illustrating steps of the read-out process for the region of interest, FIG. 10 is a schematic drawing illustrating time diagram of exposure and row-by-row reading-out of the prior art in comparison with an exposure and reading-out according to an embodiment of the present invention FIG. 11 is a circuit diagram illustrating an example of a modified pixel architecture in accordance with another embodiment of the present invention, FIG. 12 is a schematic drawing illustrating selection with propagation in case of multiple regions of interest;

DETAILED DESCRIPTION OF THE INVENTION

Figure 1:
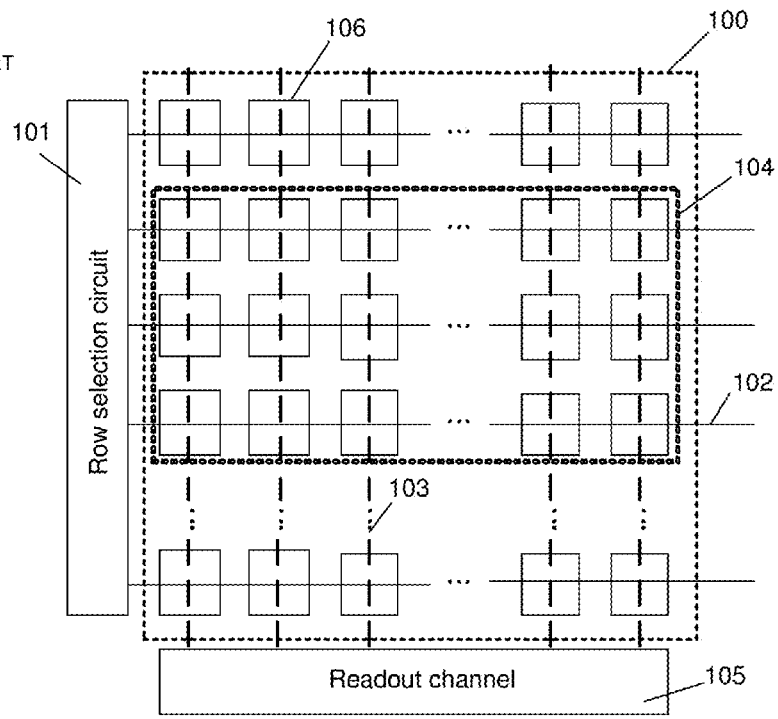

The present invention enables reading out pixels from CMOS image sensors allowing to selectively download only the pixels included in the region of interest of which the geometry can be randomly defined over the area. This approach has the advantage of higher efficiency by only downloading the desired pixels and thus speeding up the reading out procedure in contrast to the prior art in which the region of interest had to have a rectangular shape being a multiple of entire rows of the pixel area.

In order to achieve this, the present invention provides a ROI programming circuitry and a ROI reading-out circuitry as well as the corresponding methods for ROI programming and ROI reading-out as well as apparatuses making use of the ROI programming and the ROI reading-out.

In particular, a circuitry for configuring a region of interest within a sensor array comprises a ROI storage means 730 for storing a ROI indication and a control means 830 for writing into the ROI storage means of the pixel the ROI indication. Accordingly, it is possible to configure the distinguishing between the ROI pixels and the non-ROI pixels.

The term ROI refers to an area including one or more pixels to be read-out from the sensor array. Defining ROI is advantageous for application in which only a portion of the entire image captured by the sensor array is relevant, i.e. contains information or new information. In particular, the present invention is particularly relevant for applications such as three dimensional (3D) imaging based on laser triangulation, in which the speed limiting factor is the time required to downloading the pixel data out of the image sensor. The limitation to rectangular regions of interest as present in the prior art, becomes extremely inefficient as it implies downloading a huge amount of useless pixels. In contrast, the present invention enables defining one or multiple regions of interest with arbitrary shapes and downloading only these pixels which enables maximizing the sensor speed while optimizing the overall area and power consumption.

The ROI indication designates whether or not a pixel belongs to the region of interest of the sensor array. This indication may be used in the reading-out procedure of the sensor array.

Accordingly, a read-out circuitry for reading-out from the sensor array a region of interest comprises a signal storage for storing per pixel a signal detected by the pixel-sensor and, in addition, the ROI storage as described above for storing the ROI indication. The read-out circuitry further comprises a selection circuit (row-selection circuit) for selecting at least one pixel to be read-out and configured to select only pixels with the ROI indication indicating that said pixels belong to the region of interest. The read-out circuitry finally includes a read-out circuit for reading-out the signal storage of pixels selected, i.e. for reading the value of the pixel sensed.

It is noted that the rows and the columns may be exchanged. For instance, the selection may be performed on a column basis and the reading-out on a row basis.

Based on the present invention it is possible to define for each column of pixels one or multiple regions of interest of which each includes one or several pixels. The position of the regions of interest may vary from column to column in an arbitrary way. In order to achieve this in accordance with an embodiment of the present invention a pixel design, process of programming regions of interest and a process for reading-out the regions of interest are provided as will be described below. However, it is noted that some embodiments of the present invention do not necessarily make use of the full scalability of the region of interest. For instance, according to an embodiment of the present invention, the size of the ROI per column is equal for all columns of the image. Such configuration still provides scalability sufficient for some applications such as triangulation and is simpler to implement than the full flexibility as will be shown below.

Figure 4:
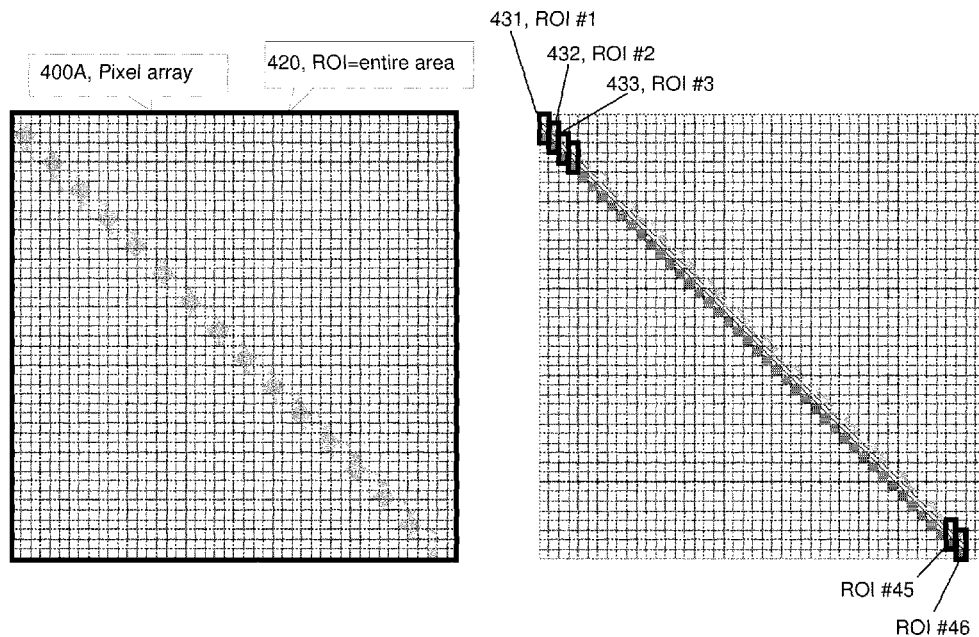
Figure 4:
Figure 4:
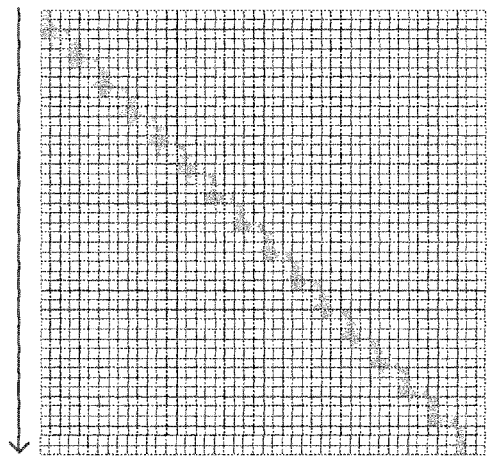

A comparison of reading out the pixels from the pixel area in accordance with the prior art and with the present invention is illustrated in FIG. 4.

FIG. 4 shows an example of a pixel area for 400A with a size of 46×46 pixels. The pixel area contains relevant information 410 ("pixel with information"). According to the prior art, since the relevant information 410 spreads vertically over the entire pixel area, the region of interest 420 is formed by the entire pixel area 400A of the sensor array. As illustrated by means of downloaded pixels 400B, the download process is performed row by row and all 46 rows are to be downloaded sequentially. This corresponds to a total time of $46 \times T_{row}$ for the download. Here, $T_{row}$ denotes a time interval spent by downloading (reading-out) a single line (row). As can be seen from this example, working in accordance with the prior art, the number of relevant pixels 410 is 3×44 which equals to 132 pixels. However, since the region of interest scalability of the prior art is limited to entire rows of the pixel area, all rows have to be downloaded in this particular example. Specifically, in addition to the 132 relevant pixels, further 46×46 132=1984 pixels have to be downloaded uselessly.

The right part of FIG. 4 shows downloading of the pixel of the region of interest in accordance with an embodiment of the present invention. In particular, pixel area 400C has the same size of 46×46 pixels as the pixel area 400A. The desired pixels including the relevant information also corresponds to pixels 410 in the previous example, now distinguished in the figure by hatching and shading into three portions corresponding to three diagonal lines. In order to speed up the download procedure and to avoid downloading all the useless pixels, each column i=1, 2, . . . , 46 has defined a corresponding respective region of interest ROI #i=ROI #1, ROI #2, . . . ROI #44, the first three of which are labeled by reference numerals 431, 432, and 433. The column ROIs 431, 432, 433 in this example each includes three pixels. Accordingly, it is possible to define individual portions of regions of interest and to download them sequentially. In particular, a first portion is formed by the first selected pixel in each of the columns regardless of its position within the column. Thus, the first portion is formed by the first of the three diagonal lines of pixels of the ROI 410, i.e. by the first pixels belonging to ROI in each of the columns.

In this way, the time for reading the region of interest as can be seen below the pixel area 400C, the time of downloading of all the selected pixels in the area reduces to less than $3 \times T_{row}$ which equals to time necessary for downloading 132 pixels. This represents a factor of improvement in the sensor maximum frame rate compared to the prior art of more than 46:3=15.3. Accordingly, in this particular example speeding up by 15.3 times is possible. It is noted that this "improvement factor" grows proportionally to the number of rows of the sensor. For instance, in machine vision applications it is very typical to use sensors of which the row count is in the order of 1000. If a similar region of interest is assumed such as a diagonal line with a thickness of 3 pixels, an improvement factor for pixel area with 1024 rows would result in approximately 1024:3=341.3 times the speed of the prior art.

It is noted that the terms "first" or "second", etc. pixel within the column refer to the first or second pixel from the top of the sensor array, typically the top of the sensor array being determined by the start of the downloading (reading-out). However, as noted above, the column-row structure may be exchanged in which case the first ROI pixel in a row would be the first ROI pixel from the beginning of the reading-out, which would typically be the left side. However, we note that it is also possible to imaging sensor control which starts reading-out from the bottom or the right side of the array. Moreover, the terms top, bottom, left, right are relative. However, usually they refer to the sensor array with respect to the position of pictures to be captured.

When the read-out control according to the above described embodiment of the invention launches the read-out signal for the first pixel row, the first pixel row comprises the first pixel in the region of interest ROI #i for each column i, the second row comprises the second pixel in the region of interest ROI #i for each column i, etc. The process continues similarly until the last pixel in the region of interest ROI #i in all columns is read out. The result of reading-out is shown in the bottom right part of FIG. 4 and consists of the three lines each with 44 pixels.

Figure 5:
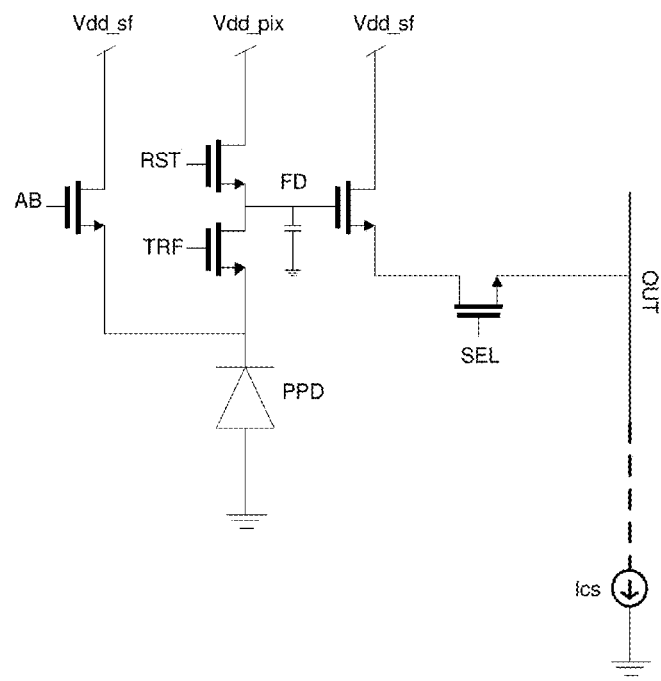

In order to achieve this improvement by only reading the region of interest, in accordance with an embodiment of the present invention a modified pixel structure is provided. In particular, FIG. 5 illustrates the simplified schematic circuit diagram of a five-transistor (5T) pinned photodiode based pixel architecture as employed usually in the prior art. The pixel circuit 500 includes a pinned photodiode (PPD), five-metal oxide semi-conductor (MOS) transistors and a floating diffusion (FD) node. The pixel is driven by the control signals AB, TRF, RST and SEL. For instance, signal TRF supplies the transfer pulses, the signal RST supplies the reset pulses and the pulse SEL supplies the selecting pulses to the pixel.

The pixels generate and collect charge representing one pixel of an image captured by the sensor array in response to light reaching the respective pixel-photo-sensitive elements, such as the photo-sensor PPD, which is in this example a pinned photo-diode. During the exposure, i.e. image acquisition time (sensing time), the light impinging in the pinned photodiode is absorbed and generates free electrons that are collected in the pinned photodiode.

Close before termination of the exposure time, the photo-generated electrons in the pinned photodiode are transferred to the floating diffusion node FD and converted to voltage at the floating diffusion capacitor ends. The charge stored in the pixel may be read-out by using a (row) selection transistor fed by the signal SEL to select the appropriate pixel and "download" the charge stored in the selected pixel, and in particular in the floating node FD.

The transistors are placed in conductive states to pre-charge the floating node FD and deplete photo sensor PPD. With the signal TRF, the corresponding transistor is placed in a non-conductive state to allow photo sensor PPD to accumulate charge during an integration period. During the integration period, a signal AB is applied to the corresponding transistor in order to avoid the excess of charge caused by intense light in a certain pixel to reach neighbor pixels. Once the integration finishes, the signal stored in the FD is readout row by row. After reading one row out, the pixels of such row are reset, and the reset signal RST is also readout, being subtracted from the original signal. This enables removing the systematic part of the reset noise. The above process is repeated for all the rows of the image.

Accordingly, the voltage corresponding to the pixel signal remains stored in the floating diffusion node (e.g. the capacitor) until the pixel is read out. In the process of reading out, the voltage in the floating diffusion node is downloaded via the in-pixel source follower and under the control of selections with the selection switch SEL that connects the pixel to the data column lines and current source $I_{CS}$ which is a part of the read-out channel 105. The above mentioned control signals AB, TRF, RST and SEL for operating the pixels are generated by the row selection circuit 101.

Figure 6:
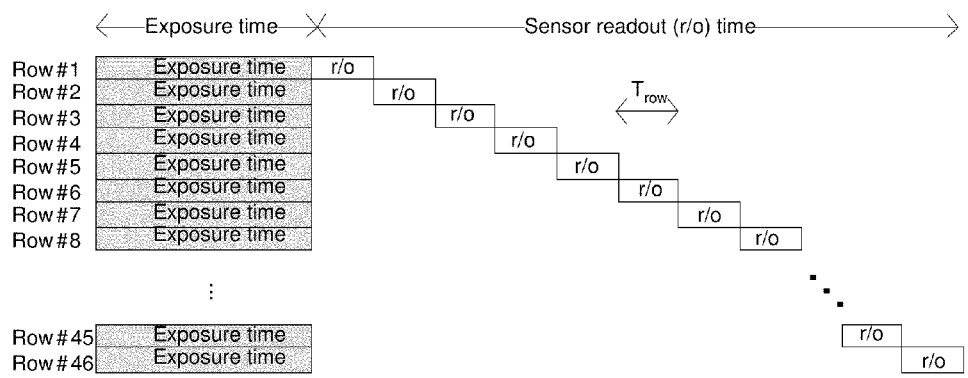

FIG. 6 shows a time diagram illustrating an example of an exposure and row by row read out which may be performed using the pixels as exemplified above with reference to FIG. 5. In particular, FIG. 6 assumes a global shutter sensor in which the image acquisition is performed in all the pixels in the sensor area simultaneously. This is illustrated by the 46 rows row #i, i=1, 2, . . . , 46 titled "exposure time" and performed in parallel. However, the process of reading out the pixels is still performed row by row by activating the SEL control signal (selecting signal) for all pixels in a respective row. This process is repeated for all rows included in the region of interest programmed in the sensor. Accordingly, as can be seen from FIG. 6, the "sensor read out (r/o) time" is 46 multiple of the $T_{row}$.

In order to shorten the read-out time, as described above, a storage means is provided on a per pixel basis for storing information whether the pixel belongs to the region of interest. Then, a circuitry and a method for programming the ROI storage is provided as well as a circuitry and a method for reading-out the ROIs.

Figure 7:
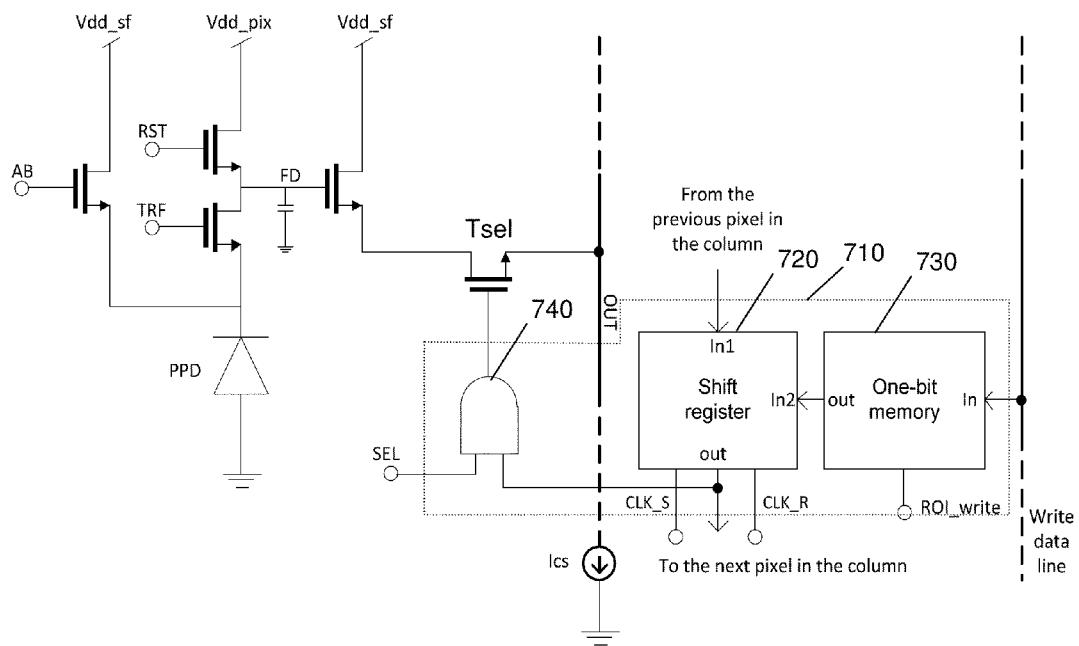

FIG. 7 shows an example of a pixel circuit in accordance with an embodiment of the present invention. In addition to the pixel 500 described above with reference to FIG. 5, the circuit of FIG. 7 includes a modified control of application of the selection signal SEL.

In the example described with reference to FIG. 5, the selection signal generated by the row selection circuit is applied directly to the row selection transistor (which) for all pixels in a row so that all of them are read in parallel, i.e. the voltage stored in there closing the diffusion node is down-loaded in parallel to the read out channel using the current source $I_{CS}$ at the bottom (at one end) of each column line (OUT). The example of FIG. 7 works basically in the same way but, in addition, the application of the selection signal to the row selection transistor SW is controlled by an additional logic module 710. This module is designed in such a manner that the selection signal is only applied to those pixels which belong to a region of interest identified by a flag stored in a pair pixel one-bit memory register. The memory is set individually for each pixel.

Consequently, it is possible to define any arbitrary region of interest having any random shape and to only download the pixels included in such a region of interest.

In detail, the example control module 710 of FIG. 7 includes a one-bit memory 730, a shift register 720 and an AND gate 740.

The AND gate 740 has as an input the selection signal SEL and an output signal from the shift register 720. The output signal from the shift register 720 indicates whether the pixel belongs or not to the region of interest. Accordingly, the selection transistor Tsel is only switched on when the selection signal is active and when the pixel belongs to the region of interest. This enables reading-out of only the pixels belonging to the region of interest.

The shift register 720 has an input (In1) for receiving a signal from the previous pixel in the column and an input (In2) from the one-bit memory 730. The shift register 720 has further an input for clock signal CLK_S and an input for clock signal CLK_R. The clock signal CLK_S controls (provides timing for) shifting of the ROI indication values to the following pixels. The clock signal CLK_R controls (provides timing for) sampling the content of the one-bit memory in input In2. This is done globally for all the pixels of the array. Moreover, the shift register 720 includes an output (out) which outputs a first value when the pixel belongs to ROI and a second value different from the first value when the pixel does not belong to the ROI. The first value may be logic "1" and the second value may be logic "0" or vice versa. The signal outputted may be input to the AND gate 740 as described above. In addition, it may be outputted to the next pixel in the column.

The one-bit memory 730 has an input from a write data line for writing a signal from the write data line 840 to the one-bit memory 730. Moreover, the one-bit memory 730 has an input for entering the ROI write signal which controls (provides timing for) the writing into the memory. The one-bit memory 730 further has an output connected to the shift register for outputting to the shift register (for reading out by the shift register) the value stored.

In the following, the operation of the pixel circuit described with reference to FIG. 7 is described.

It is noted that the image acquisition in an image sensor using the pixel architecture or defined in accordance with the present invention, may work similarly to the prior art. It is further noted that the present invention is applicable to any CMOS pixel regardless of their topology for instance pixels with a pinned photodiode or N/P or P/N type, and regardless of the number of transistors such as three-transistor (3T), four-transistors (4T) and five-transistors (5T) or any other. Regarding the pixel architecture, in accordance with the present invention a selection control means is added to a pixel irrespectively of its remaining architecture.

The operation for reading out the image sensor includes two steps, namely:

Configuration (programming) of the region of interest, and

Region of interest read out.

The first step of the definition of the region of interest may also be called the region of interest programming or setting (defining) the region of interest.

As can be seen in FIG. 7, the ROI storage means in this embodiment is a one bit memory 730 provided per pixel and having an input for receiving a ROI writing signal (ROI write) and an input (In) for receiving a ROI configuration signal from the control means. The control means 710 comprises a selection circuit 820 for generating the ROI write signal (ROI write) and a ROI programming circuit 830 for generating the ROI configuration signal. The ROI storage means 730 stores a ROI configuration signal value upon receiving the ROI writing signal (ROI write) in this way the region of interest is "programmed".

Figure 8:
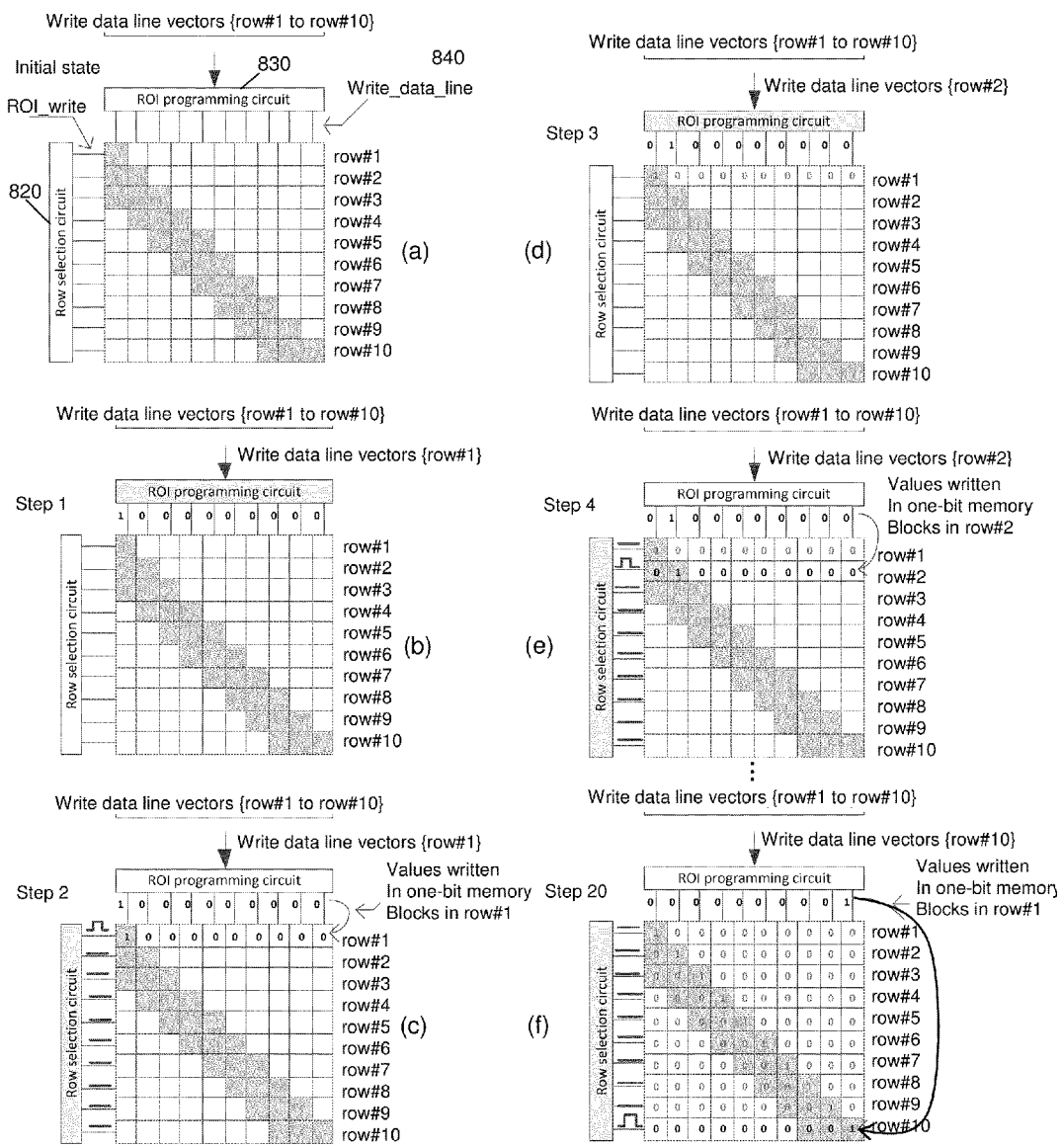

A step-wise example of region of interest programming according to an embodiment of the present invention is illustrated in FIG. 8. In this example, the region of interest is programmed by writing a logic "1" value in the one-bit memory 730 of the first pixel to be read out for each column. Accordingly, a logic "1" value is written in the one-bit memory 730 of the first pixel in the region of interest specified separately for each column of the image sensor. The one-bit memory 730 is then set to logic "0" value for the rest of the pixels in each corresponding column of the image sensor.

In this description, the pixels contained in a region of interest are denoted as "region of interest pixels" or "ROI pixels" in order to distinguish them from the remaining pixels of the image array. Similarly, the term "first region of interest pixel" or "first ROI pixel" will be employed to identify for a sensor column the ROI pixel that belongs to the sensor row which is read out first and which usually has the lowest row index (within the ROI).

The setting-up (programming) of the region of interest may advantageously be performed at the initial sensor configuration phase and may be repeated every time the region of interest definition needs to be updated, for instance after changing the monitored object or its location.

The ROI programming is preferably performed sequentially on a row-by-row basis starting with the first row in the image area which includes at least one ROI pixel and ending in the last row of the image area containing at least one ROI pixel.

Part (a) of FIG. 8 shows the initial state before the ROI programming in which the one-bit memory of the pixels in the sensor area is empty (or includes some values which are not valid anymore or which are designated to be reprogrammed). In this example, the sensor array is a 10×10 pixel array of which a region of interest is a three-pixel wide diagonal.

The pixel area 810 represents the pixels of the image sensor. The shaded pixels in the diagonal represent the pixels of the image sensor containing the relevant information and forming thus the region of interest. The row selection circuit 820 selects rows, into the pixels of which it is to be written. The ROI programming circuit 830 is configured to write data line vectors into the pixel area columns. In particular, the ROI programming circuit 830 is configured to write logic values into the one-bit memory 730 of the respective pixels.

Part (b) of FIG. 8 illustrates the first step of ROI programming. Accordingly, a logic value "1" is written into the "write_data_line", a line in the column direction of the sensor array, connecting the ROI writing circuit 830 with the column containing a ROI pixel in the first image sensor row, row #1 of ROI. It is noted that the term "row #1" denotes the first row containing at least one pixel of region of interest. For other rows which precede row #1, i.e. for rows at the beginning of the image sensor which do not belong to the region of interest, the initial write sequences only serve to write logic value of "0" into the memory elements of all the pixels in these rows. Such writing would not be necessary if by default all memory elements were initialized to a value of logic "0" by using another, different procedure such as a global initialization procedure. However, it is preferable to perform the first initializing steps at any case. The initialization is then performed by writing '0' in all bits of the "write data line" and activating the ROI_write signal for all rows simultaneously. In general, the term "row #i", with i being an integer from 1 to the number of rows N included in a region of interest, denotes the i-th row within the region of interest or regions of interest. Apart from the logic value "1" written into each column row #1-pixel the rest of the right data line column lines are set to a logic value "0" corresponding to the first row of the region of interest in the example of FIG. 8. The sequence for writing is illustrated by the data line vector 840 shown beside the right data lines in part (b) of FIG. 8.

Part (c) of FIG. 8 illustrates the second step of ROI programming. The row selection circuit 820 activates the signal the signal "ROI_write" for the pixels in row #1. This signal selects the line to the pixel of one-bit memories of which the ROI is to be written. Accordingly, the respective one-bit memories 730 of pixels in row #1 store the logic values which are in their corresponding write data lines 840. Such logic value, in this case "1" for the ROI pixel of row #1 and "0" for the remaining pixels of row #1, is set for each column of the row #1 at the output of the one-bit memory block (out) terminal of the one-bit memory 730 and remains set until a new ROI write (programming) cycle is performed. This is illustrated in FIG. 8, part (c) by the first line row #1 of the image array sensor one-bit memories field in with logic values corresponding to the shape of the ROI in this row.

Part (d) of FIG. 8 illustrates the third step of region of interest programming. Accordingly, the logic values in the column lines "write data lines" 840 are updated in such a manner that columns containing first ROI pixels in row #2 ($2^{nd}$ row within the image sensor which includes first pixels belonging to ROI) have a logic value "1" and the remaining columns of row #2 have a logic value "0".

Part (e) of FIG. 8 illustrates the fourth step of ROI programming in which the row selection circuit 820 activates the signal "ROI_write" for the second row, row #2. Accordingly, all one-bit memory blocks of pixels in the second row latch their respective values from the write data line 840 into their respective one-bit memories 730.

The above steps described for row #1 and row #2 are then repeated sequentially, row by row, until the last pixel row containing first ROI pixels is written. This final stage is illustrated in FIG. 8, part (f). This corresponds to step 20, in which the row selection circuit 820 activates writing into the last row, row #10, by signal "ROI_write". Accordingly, the values from write data lines 840 are written into the last row containing first ROI pixels, and in particular into the one-bit memories of pixels forming the last row. At this time, the ROI programming process is finished. As can be seen in the resulting programmed array 810, in part (f) of FIG. 8, the ROI in this example is defined by specifying in each column the first row, which includes a pixel belonging to region of interest. This specification is performed by setting the corresponding pixel's one-bit memory to logic value "1" and by setting the remaining column pixels to "0" (even if they belong to ROI).

Summarizing, according to the present invention, a method is provided for configuring a region of interest, ROI, within pixels of a sensor array 810. As described above, the ROI includes one or more pixels to be read-out from the sensor array. The method comprises the step of generating a ROI write signal and providing the generated ROI write signal to the pixel, and the step of, upon receiving the ROI writing signal, writing into the ROI storage means 730 of the pixel a ROI indication of whether or not a pixel is the first ROI pixel of the region of interest of the sensor array.

It is noted that according to this embodiments the resulting programmed ROI of FIG. 8, part (f) shows the content of the ROI storages of the respective sensor array pixels. In particular, in each column, the first pixel belonging to the ROI has the ROI storage storing an indication that the pixel belongs to the ROI. All other sensor array pixels in this case, including the pixels belonging to ROI but not being the first in the column belonging to ROI, are set to "0".

In the following, an example reading-out the region of interest pixels out of the image sensor is described. The reading-out process is illustrated step by step in FIG. 9. Upon the completion of the ROI programming, the first ROI pixels of all sensor columns shall have a logic value "1" stored in their respective one-bit memory elements while the memory of the rest of pixels should have logic value of "0". With this definition of ROI, the sensor read out process begins, according to which only the pixels belonging to the region of interest are read-out. The initial state is illustrated in part (a) of FIG. 9. It corresponds to the state shown in part (f) of FIG. 8, however, the zeros in the remaining one-bit memory 730 of some pixels in the image array are not shown. The row selection circuit 920 generates read-out signals (r/o signals) including the row selection signal SEL. The read-out circuit 910 reads out the values of the pixels in the image sensor at the positions of the region of interest.

Figure 9:
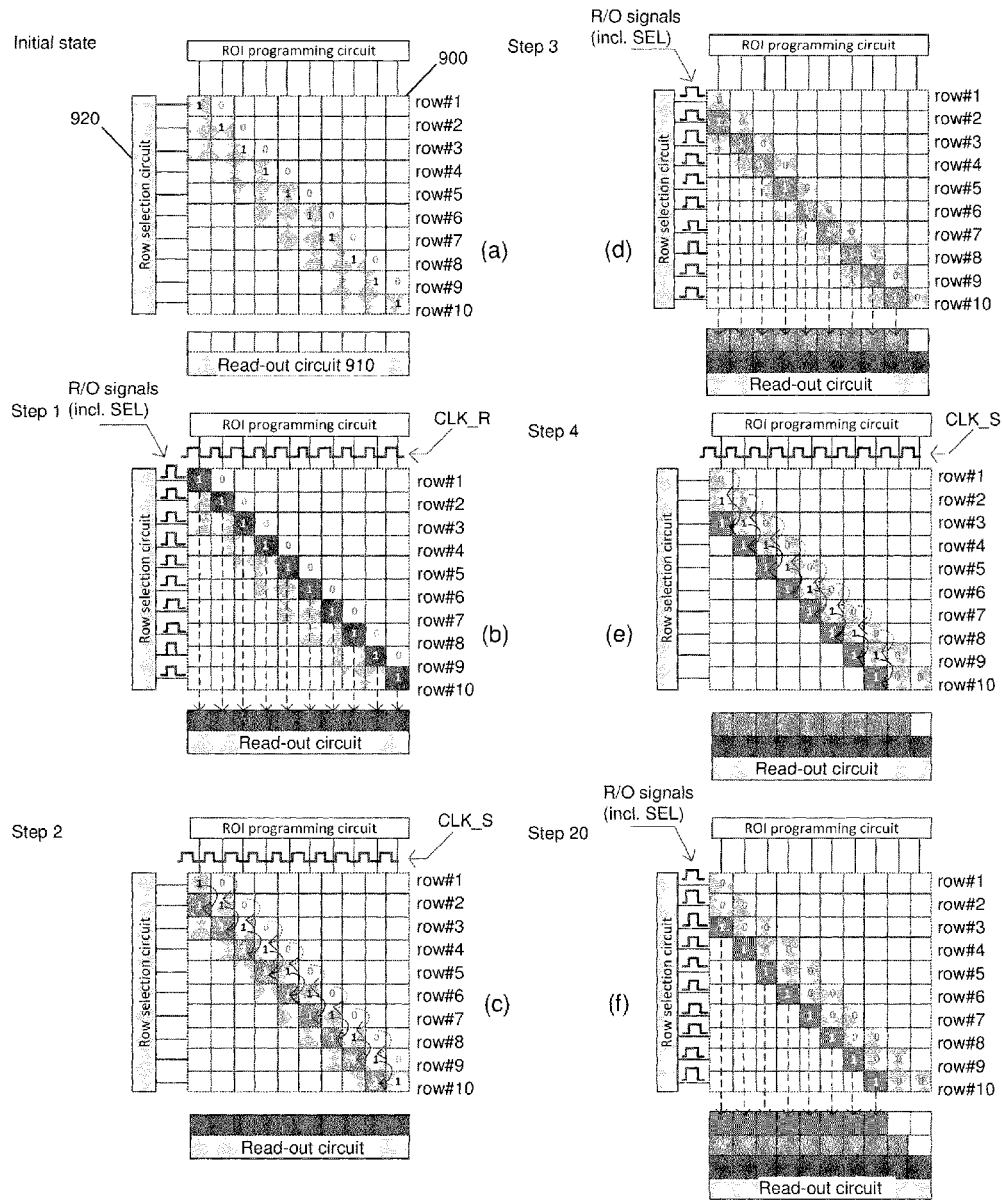

Part (b) of FIG. 9 illustrates the first step of reading-out the pixel values of the image array from the region of interest. The data at the output of the one-bit memory block ("out" of 730) is sampled by the shift register 720 input "In2". This is performed for all pixels in the array in parallel after applying a pulse to the global signal CLK_R controlling the In2 input of the shift register blocks 720 of the respective pixels. As can be seen from part (b) of FIG. 9, all the rows are selected by the row selection circuit 920. Correspondingly, the first row row #1 of the region of interest corresponding to the values of pixels on the diagonal of the pixel array 900 marked with logic values "1" is read out.

In the second step illustrated in part (c) of FIG. 9 the first line of the region of interest row #1 is read and the row selection circuit 920 activates the regular signals used for reading-out the pixels, but opposed to the prior art, in which the read-out process is done row-by row, in this case, they are applied to the entire array. Due to the per pixel logic illustrated in FIG. 7, the SEL control signal activating the download of the pixel voltage stored in the FD node only reaches the first region of interest pixels storing logic value "1" in their one-bit memories at the end of the ROI programming process, corresponding to step 20 in FIG. 8. This process triggers the download of the first ROI pixels regarding their row number.

As a next step, a CLK_S pulse is applied to the shift register 720 of all pixels in parallel. This produces a shift of the logic "1" stored in the one-bit memory of the element 730 of the first region of interest pixels to the one-bit element of the pixel in the row below the first row. Alternatively, the shift may be performed to the pixels in the row on top of the first ROI pixels. This is illustrated in part (c) of FIG. 9. These two steps are repeated as shown in part (d) in which the second row row #2 is read by the read-out circuit 910 and in part (e) of FIG. 9 in which the shift register shifts the value to the following row of the region of interest. Part (f) of FIG. 9 illustrates the final stage in which all the three lines (rows) of the region of interest ROI #1, ROI #2, ROI #3 are read and the read-out process ends.

Figure 10:
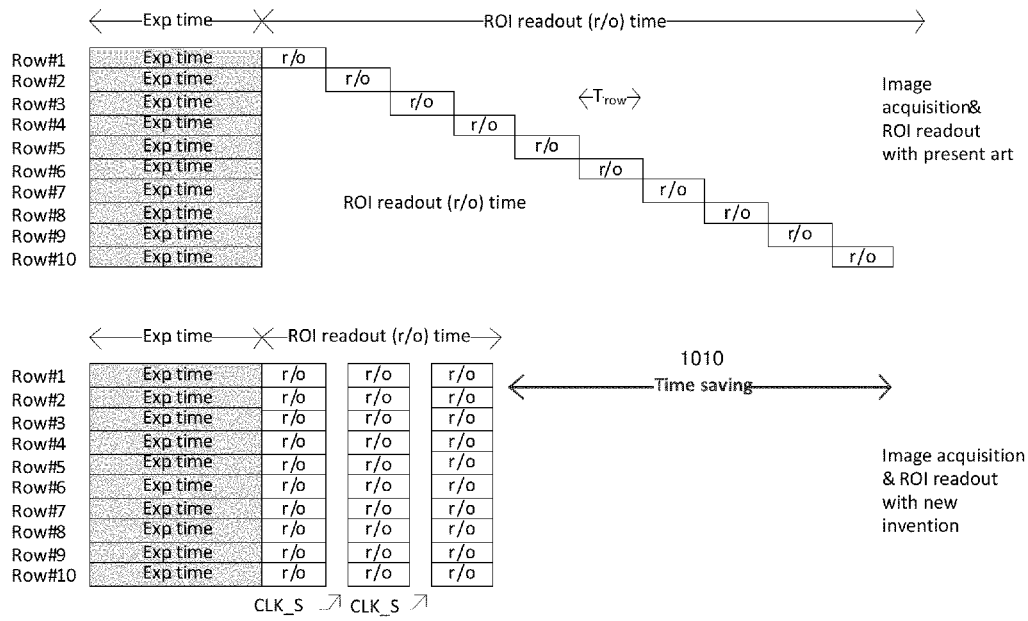

FIG. 10 compares the time necessary for reading-out the region of interest according to the prior art and in accordance with the above described embodiment of the present invention. In particular, FIG. 10 compares the time diagrams of the sensor exposure and the ROI read-out. While in the state of the art the read-out is performed locally on a row-by row basis, in the present invention, the read-out control signals may also be global, similarly to the exposure signals. With the help of the CLK_S signal, the pixels are selectively downloaded. As can be seen in FIG. 10, lower part, the read-out time for the region of interest corresponds to downloading three rows. The remaining time with respect to the prior art illustrated in the upper part of FIG. 10 represents the time savings 1010.

Accordingly, a read-out circuitry for reading-out from a sensor array a region of interest according to the above described embodiment of the invention includes a signal storage means (corresponding in the example above to the FD node) for storing per pixel a signal detected by the sensor (by the PPD in the above example). It further includes a ROI storage means for storing a ROI indication of whether or not a pixel is the first pixel of a column of the sensor array. Furthermore, a selection circuit serves for selecting at least one pixel to be read-out, the selection circuit being configured to select only pixels which belong to the region of interest, and a read-out circuit serves for reading-out the signal storage means of pixels selected.

It is noted that even when in the above example, the ROI includes at least one pixel from each column, this is not necessarily the case. The ROI can have an arbitrary shape and some columns do not necessarily have to belong to the ROI. In order to achieve this, the columns which are determined not to belong to the ROI may be switched-off (left out) for the reading and/or ROI programming process. It is to be noted that the ROI storage means in this example stores logic "1" only for pixels which are the first within respective columns of the sensor array belonging to the region of interest. The example of FIGS. 8 and 9 shows a ROI with the same width of three pixels in each column. Especially for the applications such as triangulation, the ROIs with the same width in all columns are usual. This enables a particularly advantageous implementation of the ROI programming and reading-out circuits which only need to read out the ROI storage memory of the first ROI pixel in each column and then to employ a counter, common for the entire picture, which ensures that the shift register reads-out the required number of pixels in each column.

Alternatively, in accordance with another embodiment of the present invention, a counter may be provided per column. This enables an arbitrary configuration of the ROI shape.

Still alternatively, the ROI storage means may store logic "1" not only for the first but for all pixels belonging to ROI. In such case, the architecture as shown in FIG. 7 would not need any shift register and the architecture would differ from that of FIG. 5 basically by the ROI storage means controlling the selection transistor. However it is to be noted that such an implementation would lead to a rather high complexity of reading and to slowing down the operation. Accordingly, the storing of the first ROI pixel in a column and providing a counter (per column or per image) is the preferred solution.

Figure 15:
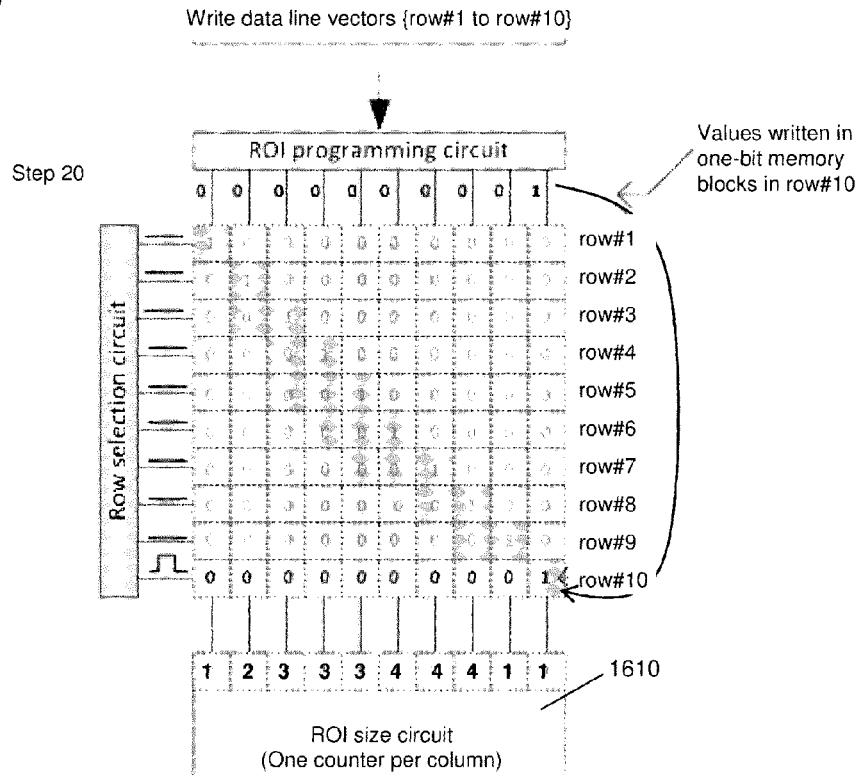
FIG. 15 is a schematic drawing illustrating a step of ROI programming for an exemplary embodiment in which the ROI size is adjustable per column.

FIG. 15 illustrates the programmed ROI according to the above mentioned embodiment in which the ROI size (in number of pixels per column) may vary from column to column. In such a case, the ROI programming works in a very similar way to the ROI programming as described above with reference to FIG. 8 since the first ROI pixels per respective columns remain the same. However, in addition to storing in the ROI storage means 730, 1130, 1340, 1440 the information on whether the pixel is a first pixel within the column in the region of interest, also a count value per column is set to an appropriate value. Such value would be in the example of FIG. 15 value 0 (or 1, depending on the start of counting) for the first, ninth and tenth column, value 1 (or 2) for the second and sixth to eight column, and value 2 (or 3) for the third to fifth column. This is illustrated by the values "1 2 3 3 3 2 2 2 1 1" entered to a ROI size circuit 1610 which includes one counter per column. It is noted that even when in this example, the ROI size circuit is drawn separately, in a real implementation it may be a part of the ROI programming circuit and/or the ROI reading-out circuit.

Figure 16:
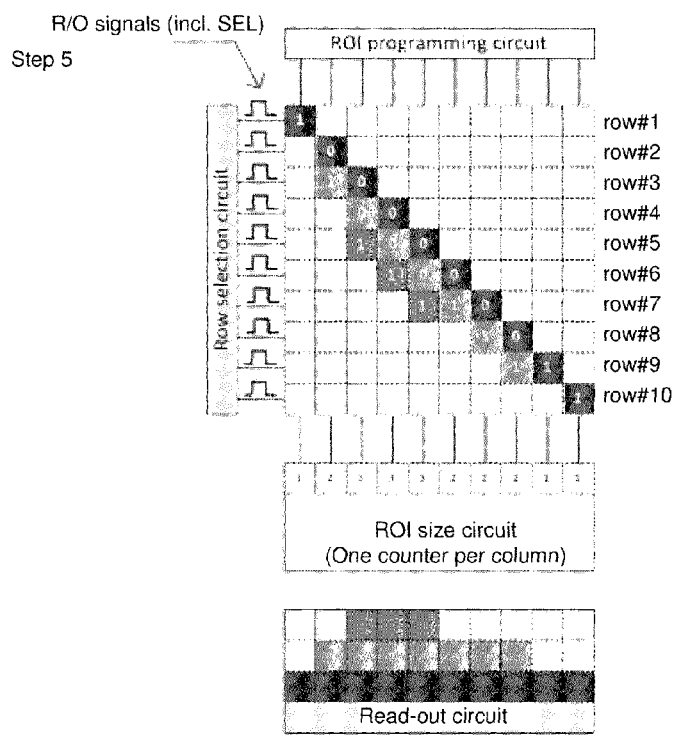
FIG. 16 is a schematic drawing illustrating a step of reading out of a ROI for an exemplary embodiment in which the ROI size is adjustable per column.

Correspondingly, FIG. 16 shows schematically reading-out of a variable-size ROI as programmed according to the example of FIG. 15. The reading-out process is also similar to the reading-out process as described with reference to FIG. 9. However, the reading-out speed is limited by the largest vertical size of ROI among the columns of the ROI. Accordingly, dummy pixels are inserted (the reading-out is not performed but the time is spent) in the portions in other columns which do not include information pixels in all rows of the largest-size column ROI. FIG. 16 shows the fifth step of reading-out. In particular, all the rows are selected and it takes three times Trow to read out the ROI even when not all columns actually include all three ROI rows. As can be seen in FIG. 16, the first pixels in ROI of each column were already read-out, corresponding to the widest bottom line of the read-out circuit. The ROI value was shifted to the second pixels in ROI of each—column however only in columns, the counter of which indicates that there is more than one row in the ROI of that column. Then the second ROI row was read, corresponding to the second widest row (and second from the bottom) in the read-out circuit. The ROI value of the second-ROI-row pixels was then shifted for those columns which have the ROI with the width of 3 pixels (decided based on the counter) and the last row of ROI including only three pixels was read.

The shift register advantageously comprises an input In1 for receiving a signal from a ROI storage means of another pixel preceding said pixel within a line of pixels, an input In2 for receiving a signal from the ROI storage means, and an output "out" for passing a signal received to a ROI storage of another pixel following said pixel within the line of pixels and to the selection circuit. The selection circuit is configured to select the pixels in accordance with the signal input from the shift register.

In summary, the present invention provides a modified pixel architecture, a process for programming region of interest and a procedure for reading all the regions of interest which enables to selectively download pixels from an arbitrarily shaped region of interest. It is noted that the modified pixel architecture is suitable not only for the global shutter pixel (5T pixel) but also for any other pixel type. For instance, for rolling shutter sensors in which both the exposure and the read out is done sequentially in a row by row basis, the present invention does not provide much benefit. However, the regions of interest are usually only employed in global shutter high speed sensors. The present invention is particularly suitable for laser triangulation sensors used in three dimensional vision systems. However, it is applicable to any other application, too.

The present invention is not limited to reading out a single (continuous) region of interest per column. A plurality of regions of interest per column may be defined.

Figure 11:
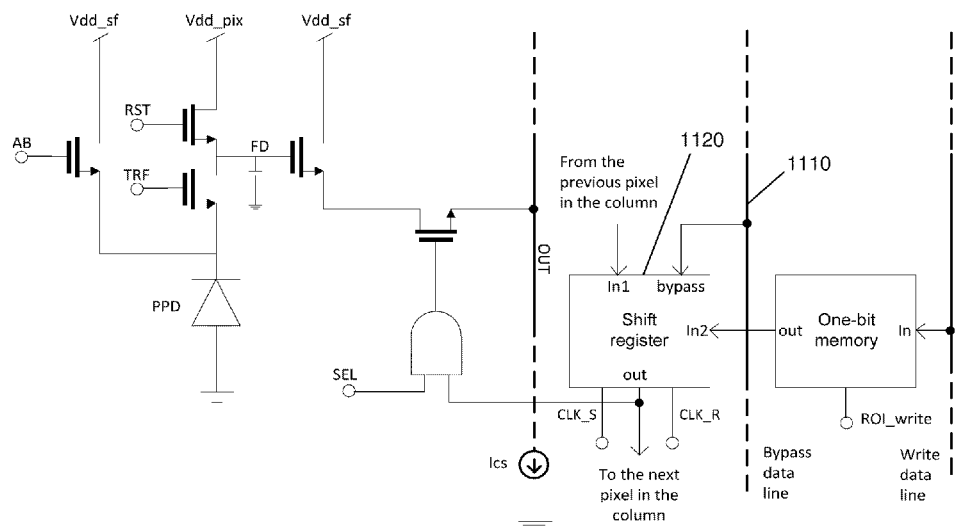
Figure 12:
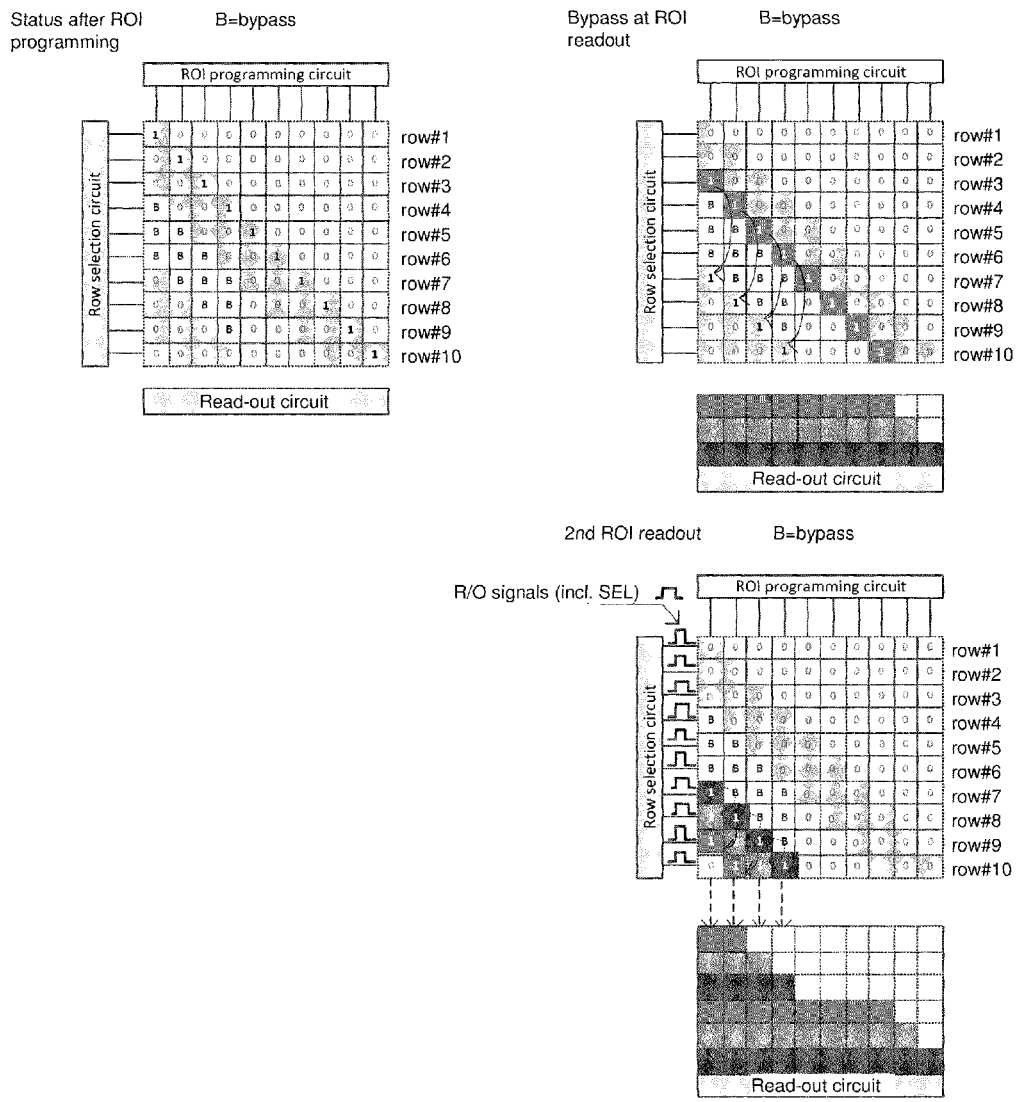

In order to achieve this, FIG. 11 shows an example of the pixel architecture and FIG. 12 illustrates in its top left part the result of the corresponding region of interest programming and on its right part reading out of the pixels from two regions of interest.

The pixel architecture of FIG. 11 differs from the pixel architecture shown in FIG. 7 in that the shift register 1120 includes a second input denoted as "bypass". This "bypass"

input is set to logic value "1" during ROI programming for those pixels in each column, which are placed between two regions of interest and not belonging to either of them. When the shift register 1120 is configured by bypass, any value received at its input In1 is immediately transferred to its output "out". In this way, when the shift register 1120 in bypass mode receives a logic value "1" during the region of interest read-out, it automatically passes the value to the next shift register (shift register of the next pixel in the column) and this process continues until it reaches the next shift register in the column which is not in bypass mode. At this point, the region of interest read out continues in a usual way.

This is shown in FIG. 12. Pixels marked as "B" are the bypassed pixels. The signal "bypass" in the architecture is transported by a bypass data line 1110. The signal may consist of pulses carrying logic value "1" or "0" for signaling whether the current pixel is to be bypassed or not. As can be seen in the right bottom part of the figure, in this way, even when there are more regions of interest in a single column, the reading out is only performed for these regions of interest.

It is noted that in order to support bypassing, and thus the multiple ROIs per column of a picture, there is to be a storage to store a bypass indication which indicates for a current pixel whether or not the current pixel is a bypass pixel or not. Such bypass storage may be, similarly to the ROI storage, a one-bit memory for storing whether or not the pixel is to be bypassed. The architecture shown in FIG. 11 assumes that such bypass bit is stored in a bypass storage within the shift register itself.

However, the present invention is not limited to such an embodiment, and a separate storage means may be provided.

Alternatively, the ROI storage means may be capable of distinguishing apart from the "0" and "1" also a value of "B" indicating a bypass pixel. This could be implemented, for instance, by providing ROI storage means with capacity higher than one bit per pixel, for instance, with a capacity of two bit per pixel.

In summary, in order to implement the bypass feature, the circuitry's shift register includes an input for receiving a bypass signal and the shift register is configured to transfer the signal from a ROI storage means of the previous pixel to the output upon receiving the bypass signal with a predefined value.

Regarding the ROI indication, it is preferably one bit long, taking a first value for the first pixel in a column of the sensor array which belongs to the region of interest and a value different from the first value for all other pixels in said column. However, the present invention is not limited to this and the indication may include more bits, for instance, for signaling bypass.

The ROI programming and the read-out circuitry may be a part of further apparatuses. For instance, an apparatus may be provided which includes a read-out circuitry as described above and connectable to a sensor array matrix including a plurality of pixels and which further includes a circuitry according as described above for configuring a region of interest, ROI, within the sensor array matrix. Such apparatus may be an image sensor which further includes write data lines connecting pixels of the sensor array matrix with the circuitry for configuring ROI, selection lines connecting pixels of the sensor array matrix with the selection circuit, and signal data lines connecting pixels of the sensor array matrix with the read-out circuitry.

The image sensor as described above may be a part of an apparatus for triangulation. Such apparatus for triangulation is then including in addition a light source 312 for irradiating an object 320; and the image sensor 316 for sensing the light reflected from the irradiated object 320. It is noted that the term "light" here is not necessarily a light in the visual range and may be a general electromagnetic sensing wave.

Moreover, the reading-out circuit may be implemented as a separate integrated circuit. Parts of the ROI programming circuit may also be implemented as a separate integrated circuit. However, the ROI programming circuitry and the read-out circuitry may also be implemented in a common integrated circuit. Furthermore, a common sensor chip may implement the reading-out, programming circuitry and also the sensor including the signal, selection and programming lines.

As described above with reference to FIG. 9, a method for reading-out from a sensor array 100 a region of interest advantageously comprises selecting at least one pixel to be read-out, the selection circuit being configured to select only pixels with a predefined value of a ROI indication stored per pixel and indicating whether or not said pixel belongs to the region of interest of the sensor array 100; and reading-out a signal from the selected pixels.

In particular, the reading-out method may comprise a first reading-out from each column the first pixel belonging to the region of interest, shifting the ROI indication values of the pixels read-out to the respective pixels following the read-out pixels in their respective columns thus redefining the region of interest, storing for each read-out pixel the ROI indication values of the respective pixels preceding the read-out pixels in their respective columns, and a second reading-out from each column the first pixel belonging to the redefined region of interest. In other words, the shifting, storing and reading out may be repeated for each further row of a region of interest in a column.

Moreover, advantageously, the reading-out method may further comprise detecting a bypass signal; and transferring the signal from the ROI storage means of the previous pixel to the output upon detecting the bypass signal with a predefined value.

In particular, the method for reading-out the sensor array may include sensing with all pixels of the sensor array at the same time for a predefined exposure time period and reading-out sequentially portions of the region of interest including respectively i-th pixel belonging to the region of interest in each of the sensor array columns, i being an integer from 1 to K, K being an integer denoting the number of pixels in a column belonging to the region of interest (for the ROI of FIG. 9, K=3).

It is to be noted that the pixel-related circuitry shown above in FIG. 11 is also only an exemplary circuitry which is not limiting for the present invention. As mentioned above, the present invention is applicable for any architecture of a pixel, not only for the exemplified 5T-architecture. In order to enable ROI configuration and reading-out accordingly, the central element is the providing of ROI storage means for storing an indication of the first pixel in column belonging to ROI and the count indicating the vertical size of the ROI per column or per picture. However, the architecture itself may vary.

For instance, the example circuitry described with reference to FIG. 11 is suitable for reading out the pixels row-by row. However, it is not suitable in implementations, in which there are several rows connected to the readout channel.

Figure 13:
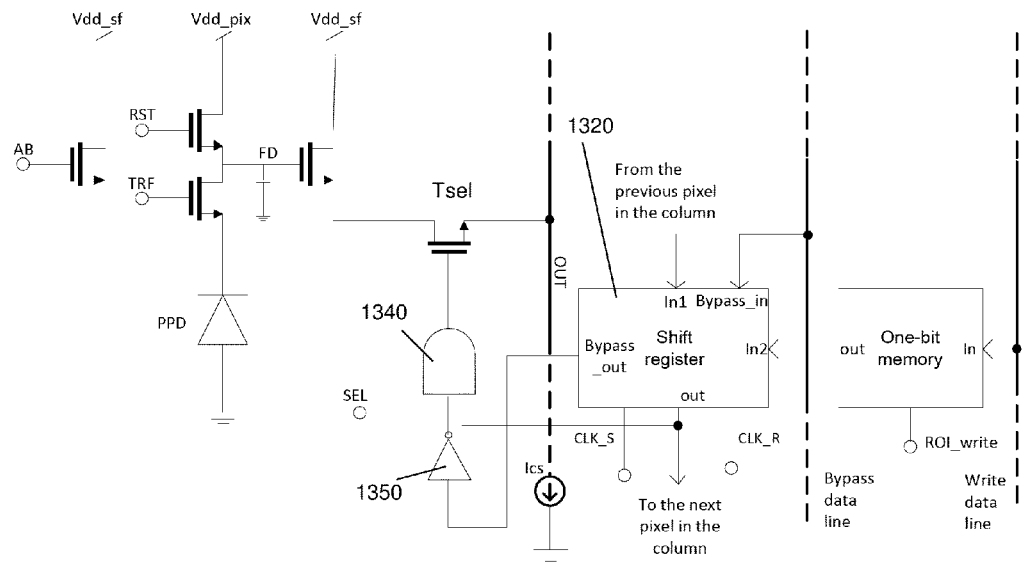
FIG. 13 is a circuit diagram illustrating the five-transistor pixel architecture of FIG. 5 modified in accordance with another embodiment of the present invention.

FIG. 13 illustrates another example pixel-related circuitry containing a modification of the circuitry of FIG. 11 for multiple ROIs.

In general, the circuitry of FIG. 13 works similarly as the circuitry of FIG. 11. The modification consists in the following: The shift register includes a bit to store the state of the bypass pixels.

Then, the output of such bit is negated and connected as a third input of the logic AND gate present in the pixel. This makes bypassed pixels not to be connected to the output line, even when the SEL signal is set for a bypassed pixel. Correspondingly, the shift register 1320 of FIG. 13 includes, in addition to the shift register 1120 of FIG. 11 a bypass output "bypass_out" which outputs a signal that is further input to a negation gate 1350, of which the output is provided to the input of an AND gate 1340. The negation gate 1350 outputs a negated version of its input signal. The AND gate 1340 has three inputs and outputs the result of a logical "and" operation of the three signals. Accordingly, the selection transistor Tsel is only opened (switched on) when the selection signal is active and the shift register output indicates that the pixel belongs to ROI and the pixel is not bypassed.

However, it is to be noted that other (also simpler) architectures of the pixel-related circuitry are possible. For instance, the AND gate 740 of the pixel may be removed and the output (out) of the shift register 720 may be directly connected to the selection transistor Tsel. This is shown in FIG. 14.

Figure 14:
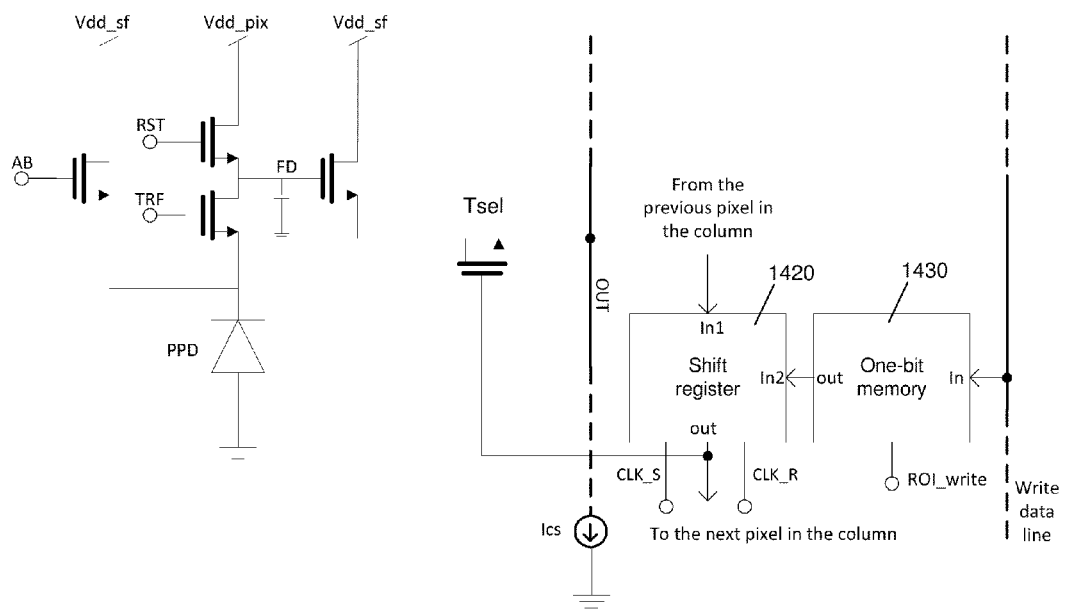
FIG. 14 is a circuit diagram illustrating the five-transistor pixel architecture of FIG. 5 modified in accordance with yet another embodiment of the present invention.

The circuitry in FIG. 14 works similarly to the concept described above with reference to FIG. 7. Programming of the ROI is the same since the AND gate 740 is only used when reading out the pixels. However, when the CLK_R signal is activated in order to transfer the content of the one-bit memory to the shift register 1420, the read-out process starts, since the output of the shift register 1420 (a logic "1" for the first pixel of the ROI) activates the selection transistor of the first pixel of each ROI. Then, similarly to the other architectures shown in FIGS. 7, 11, and 13, by pulsing the CLK_S signal, the first pixel of every column is sent to the below pixel (the following pixel in the same column), leading to disconnecting the first pixel from the column line and connecting the following pixel. As is clear to those skilled in the art, signal CLK_S (shifting clock signal) has a one value when the ROI value of the pixel of the current ROI-row in each column is to be shifted to the following pixel and another value otherwise. CLK_R (reading-out clock signal) signal works in a similar manner. Thus, according to the architecture of FIG. 14, the shift register 1420 alone controls selection, i.e. activation of the selection transistor Tsel.

By using the architecture of FIG. 14, the same respective results are obtained as achieved by the other above architectures, but one logic gate per pixel is saved, enabling simpler and cheaper implementation.

This effect is possible when only the first pixel of each ROI (its one-bit memory) contains a logic "1", since in other case, several rows would be shorted in the output line.

Figure 17:
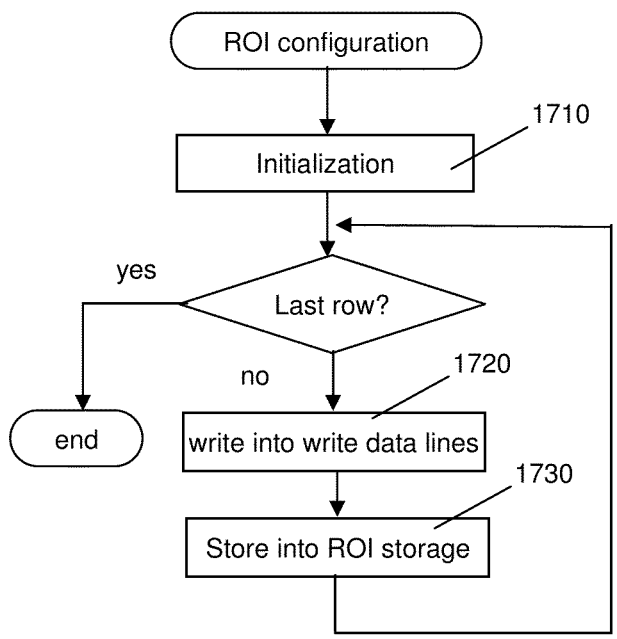
FIG. 17 is a flow diagram illustrating the configuration of the region of interest within a sensor area.

The method of programming the region of interest (ROI) is illustrated in a flow diagram of FIG. 17. In particular as first step the ROI storage means for each pixel in the sensor area is initialized 1710 to a second value (such as logic "0"), different from the first value (such as logic "1") which indicates that a pixel belongs to a ROI (or indicating, in some embodiments, that a pixel is the first pixel belonging to ROI within a line of pixels such as column). Then for each of the rows in the sensor area (until there is no further row), the write data lines are filled 1720 with values to be written into the ROI storages of the pixels in the row. Afterwards, the values in the write data lines are written 1730 into the respective ROI storages of the pixels in the row.

Figure 18:
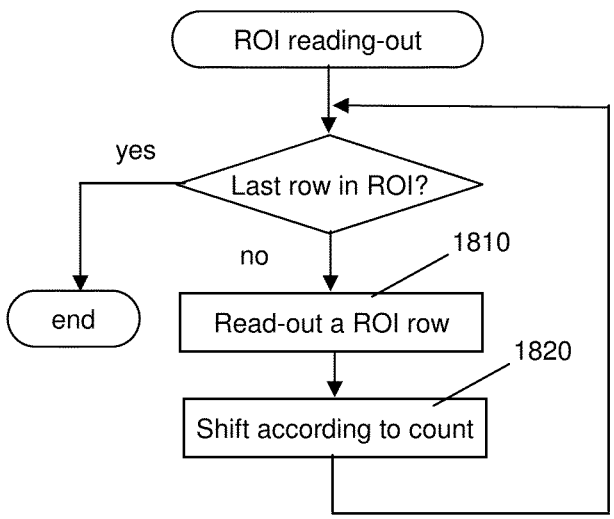
FIG. 18 is a flow diagram illustrating the reading-out of the region of interest within a sensor area.

Similarly, FIG. 18 illustrates reading-out procedure in which only the ROI is read. In particular, for each row of the region of interest (not the entire sensor area), the row of ROI is read 1810. This is performed by reading out the first pixel belonging to ROI in each column. Then, in accordance with the count value, the ROI is shifted 1820 and the second pixel belonging to ROI within each column is read-out and so on until the entire ROI is read-out.

According to an aspect of the present invention, a circuitry is provided for configuring a region of interest, ROI, within pixels of a sensor array, the ROI including one or more pixels to be read-out from the sensor array. The circuitry comprises a ROI storage means for storing a ROI indication indicating that a pixel belongs to the region of interest of the sensor array; and a control means for writing into the ROI storage means of the pixel the ROI indication.

In accordance with an advantageous embodiment of the present invention, the ROI storage means is a one-bit memory provided per pixel and having an input for receiving a ROI writing signal and an input for receiving a ROI configuration signal from the control means.

The control means preferably comprises a selection circuit for generating the ROI write signal and a ROI programming circuit for generating the ROI configuration signal; and the ROI storage means is configured to store a ROI configuration signal value upon receiving the ROI writing signal and the ROI storage means is configured to store a first value when the pixel is a first pixel belonging to ROI within a line of pixels and to store a second value, different from the first value otherwise.

According to another aspect of the present invention, a read-out circuitry is provided for reading-out from a sensor array a region of interest, ROI, including one or more pixels. The read-out circuitry comprises a signal storage means for storing per pixel a signal detected by the sensor; a ROI storage means for storing a ROI indication indicating that a pixel belongs to the region of interest of the sensor array; a selection circuit for selecting at least one pixel to be read-out, the selection circuit being configured to select only pixels with the ROI indication indicating that said pixels belong to the region of interest; and a read-out circuit for reading-out the signal storage means of the selected pixels.

In accordance with an advantageous embodiment of the present invention, the read-out circuitry includes a shift register including an input for receiving a signal from a ROI storage means of another pixel preceding said pixel within a line of pixels; an input for receiving a signal from the ROI storage means; and an output for shifting a signal received to a ROI storage of another pixel following said pixel within the line of pixels and to the selection circuit, wherein the selection circuit is configured to select the pixels in accordance with the signal input from the shift register, the ROI storage means is configured to store a first value when the pixel is a first pixel belonging to ROI within a line of pixels and to store a second value, different from the first value otherwise, and the shift register is configured to perform the shifting a predetermined number of times.

Preferably, the circuitry further comprises a bypass storage means for storing a bypass indication for a pixel indicating by a predefined value that said pixel is to be skipped during reading-out, the shift register includes an input for receiving a bypass signal corresponding to the bypass indication; and the shift register is configured to transfer the signal from a ROI storage means of the previous pixel to the output upon receiving the bypass signal with the predefined value.

Advantageously, the ROI indication is one bit long, the ROI indication takes a first value for the first pixel in a column of the sensor array which belongs to the region of interest and a value different from the first value for all other pixels in said column, and the circuitry comprises a counter storage for storing an indicator of the number of pixels in said column belonging to ROI.

For instance, the circuitry's counter storage is adapted to store the indicator of the number of pixels in the column belonging to ROI for each column separately or commonly for all columns of the sensor area.

According to an aspect of the present invention, an apparatus is provided for image sensing comprising: the read-out circuitry as described above connectable to a sensor array matrix including a plurality of pixels; the circuitry as described above for configuring a region of interest, ROI, within the sensor array matrix; write data lines connecting pixels of the sensor array matrix with the circuitry for configuring ROI, and selection lines connecting pixels of the sensor array matrix with the selection circuit; and signal data lines connecting pixels of the sensor array matrix with the read-out circuitry.

Moreover, according to an embodiment of the present invention, an apparatus is provided for triangulation including: a light source for irradiating an object by means of a laser beam; and the apparatus according to claim 8 for sensing the light reflected from the irradiated object.

An advantageous implementation of the present invention provides an integrated circuit implementing any of the circuitry embodiments mentioned above.

According to another aspect of the present invention, a method is provided for configuring a region of interest, ROI, within pixels of a sensor array, the ROI including one or more pixels to be read-out from the sensor array. The method comprises the following steps performed for one pixel: generating a ROI write signal and providing the generated ROI write signal to the pixel; upon receiving the ROI writing signal, writing into the ROI storage means of the pixel a ROI indication indicating that a pixel belongs to the region of interest of the sensor array.

According to another aspect of the present invention, a method is provided for reading-out from a sensor array a region of interest, ROI, including one or more pixels and comprising the steps of for selecting at least one pixel to be read-out, the selection circuit being configured to select only pixels with a predefined value of a ROI indication stored per pixel and indicating that said pixel belongs to the region of interest of the sensor array; and reading-out a signal from the selected pixels.

Preferably, the method includes a first reading-out from each column the first pixel belonging to the region of interest, shifting the ROI indication values of the pixels read-out to the respective pixels following the read-out pixels in their respective columns thus extending the region of interest, wherein the shifting is performed a predetermined number of times, storing for each read-out pixel the ROI indication values of the respective pixels preceding the read-out pixels in their respective columns, and a second reading-out from each column the first pixel belonging to the redefined region of interest.

Advantageously, the method further comprises determining a bypass signal for a pixel, specifying by a predefined value that said pixel is to be skipped during reading-out; and transferring the signal from the ROI storage means of the previous pixel to the output upon detecting the bypass signal with a predefined value.

In accordance with an embodiment of the present invention, the method includes sensing with all pixels of the sensor array at the same time for a predefined exposure time period; and reading-out sequentially portions of the region of interest including respectively i-th pixel belonging to the region of interest in each of the sensor array columns, i being an integer from 1 to N, N being an integer denoting the number of pixels in a column belonging to the region of interest.

As explained above, there are many imaging and vision applications where the information of interest is not distributed in the whole image, but concentrated in a region of interest. In accordance with the above described embodiments, cameras can benefit from downloading only ROI, instead of the whole image, which enables increasing the frame-rate. Accordingly, methods enabling reading image sensors more efficient and rapid calculation and download of ROIs are particularly interesting for high-speed vision and imaging applications as they allow increasing the frame-rate without using faster and thus more expensive image sensors. An approach for selecting and downloading ROIs with random (arbitrary) geometry has been introduced above. This approach can provide a considerable benefit for some applications in terms of resources needed to achieve a certain frame-rate compared to downloading of usual rectangular shaped ROIs.

In the above examples described with reference to the drawings, the ROI includes at least one pixel from each column, i.e. the ROI is read-out (and programmed per entire ROI-row). However, this is not to limit the present invention. Accordingly, the ROI can have an arbitrary shape. Some columns do not necessarily have to belong to the ROI. When programming the ROI, the read-out channels (columns), which do not belong to the ROI may be deactivated. This can be performed in various ways, for instance, by storing information indicating the first (and/or last) column belonging to the ROI. When reading-out the ROI, only the active columns are read-out. In the following, an approach for determining (calculating) the ROI will be presented as an embodiments of the present invention. In particular, an approach for determining which part of the image contains the information of interest and quickly re-programming the sensor so that only this ROI is read-out. Accordingly, the following embodiment of the present invention provides architecture for CMOS image sensors allowing to calculating without latency the size and the coordinates of a ROI based on the processing of the image acquired by the sensor and obtaining certain characteristics determining the ROI.

The usual reading-out of the image sensor has been described above. The imager sensor captures at first an image, which remains stored in the pixels until read-out by the read-out channel. The pixel array is read-out (completely or partially) with a read-out circuitry. Normally, as a part of the read-out process, the read-out channel also digitizes the image. Let us represent the amount of time required by the readout channel to download the image from the pixel array and digitize it by the term $T_{frame}$. After read-out the image is stored in a digital memory and a processor processes the image during certain period of time $T_{proc}$ following predefined algorithm(s). The memory can be placed inside the image sensor chip or outside of it. The processor can also be placed externally or on-chip.

The result of the processing provides the identification data of the information of interest in the image and with this identification data (information) the size and the coordinates of the ROI are calculated. The ROI size and coordinates are used to program the row selection circuit so that the programmed ROI is applied to the next frame to be readout. Let us denote the time required for re-programming the ROI definition in the row-selection circuit as $T_{re\text{-}prog}$.

In high-speed modern sensors the frame-rate $FR_{max}$ is determined as the inverse of the time required to read-out a frame, i.e.

$$FR_{max}=1/T_{frame}.$$

Thus, the time $T_{ROI\_update}$ required by a system to recalculate and update a ROI is given by $$T_{ROI\_update}=T_{frame}+T_{proc}+T_{re\text{-}prog}.$$

If ROI is updated in each new frame, the maximum frame-rate needs to be reduced by the processing time. Accordingly, $$FR_{max}=1/T_{ROI\_update}.$$

Alternatively, a ROI calculated by processing an image captured in time instant t can only be updated for the image to be captured in the time instant $t+N \times T_{frame}$ where $N \geq T_{processing}/T_{frame}$.

This embodiment of the present invention provides an approach capable of reducing the time required to recalculate and update the ROI definition so that the ROI which is applied to readout the information of the frame captured in the time instant t is calculated by processing information in the same frame. This means that it is possible to achieve no latency at all. This is crucial for applications, such as 3D imaging based on laser triangulation, where the characteristics of the ROI may change drastically from image to image. Moreover, the position of the ROI is calculated independently for each column, providing ROIs with arbitrary shape, in contrast to the usual rectangular ROIs.

In particular, according to this embodiment of the invention, a circuitry is provided for determining a region of interest, ROI, within pixels of a sensor array. The ROI includes one or more pixels to be read-out from the sensor array by a second read-out circuitry. Moreover, the circuitry for determining ROI comprises a first read-out circuitry adapted for reading-out pixels from the sensor array faster than the second read-out circuitry, and a processing unit for determining the ROI based on the pixel read-out by the first read-out circuitry.

Figure 19:
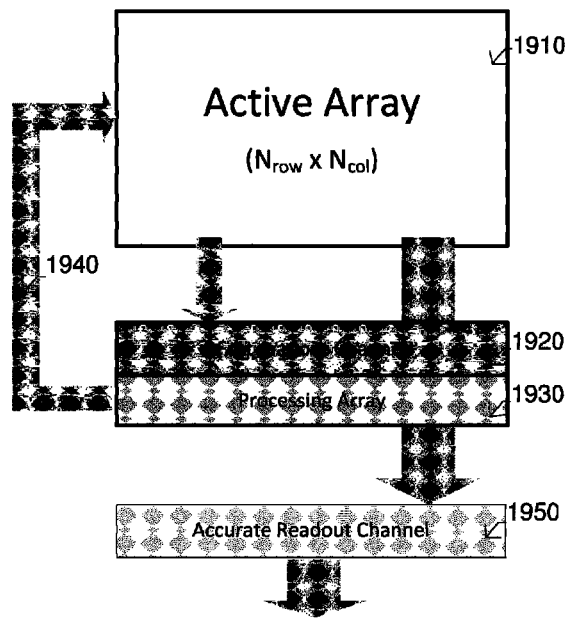
FIG. 19 is a block diagram of an example CMOS sensor provided with an automatic ROI detection function.

FIG. 19 shows a simplified architecture of a CMOS sensor which may implement the embodiments of the present invention. In particular, FIG. 19 shows a pixel array 1910 with the number $N_{col}$ of columns and number $N_{row}$ of rows, i.e. an $N_{row} \times N_{col}$ sensor pixels. A first, fast read-out channel 1920 (a read-out circuit) is connected to the pixels of the pixel array 1920 and serves for reading-out the sensed values of the pixels. Moreover, a processing array 1930 has an input for receiving the value of pixels downloaded by the read-out channel 1920 and determines the current ROI. The processing array has further an output for outputting the determined ROI to the pixel array. A second, accurate read-out channel 1950 has an input for reading-out the pixels contained in the calculated ROI from the pixel array 1910 with higher accuracy than the first read-out channel 1920.

Advantageously, a first read-out step is performed by reading-out the entire pixel array 1910 at a high speed and with low accuracy using the fast-readout channel 1920. Although the accuracy of the fast read-out is lower compared to a regular reading-out of data, it is sufficient to, by means of processing the image data with an (for instance on-chip) array of image processors 1930, calculate the position of the ROI in the image. The position of the ROI is then fed back 1940 to the pixel array 1910 to mark the pixels that shall then be read-out with full accuracy using the accurate and slower readout channel 1950. The initial fast readout by the first, fast read-out channel 1920 is made in a non-destructive manner.

Figure 3A:
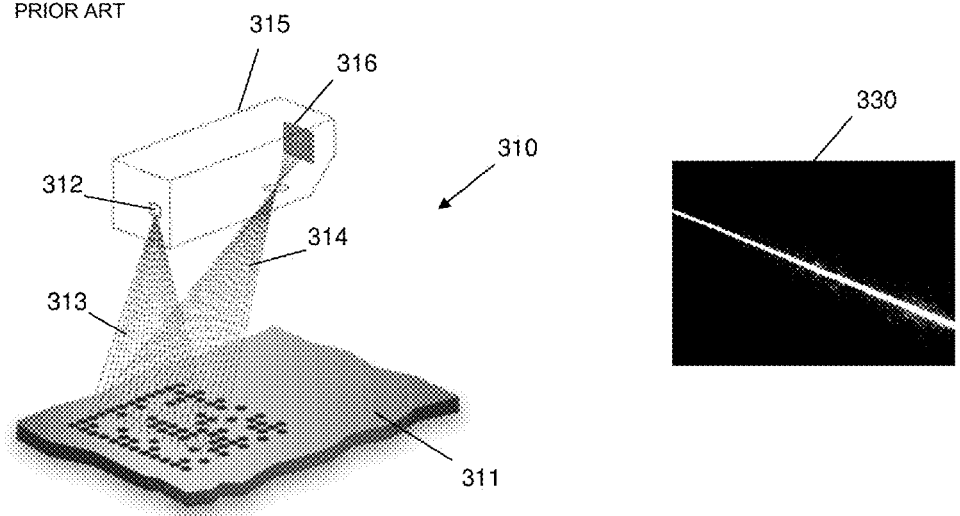
Figure 3B:
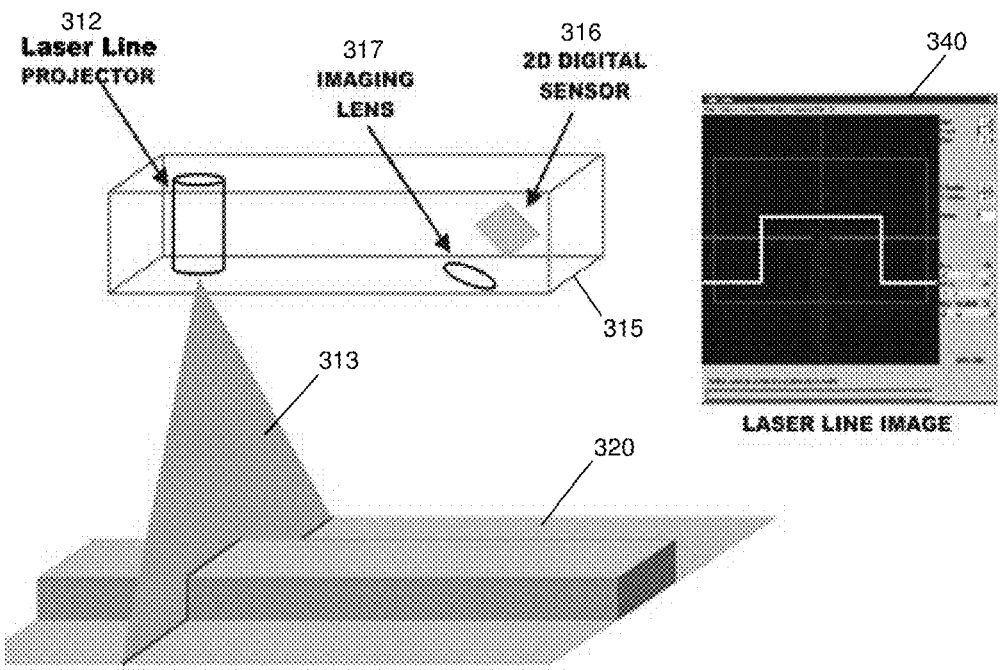
Figure 20:
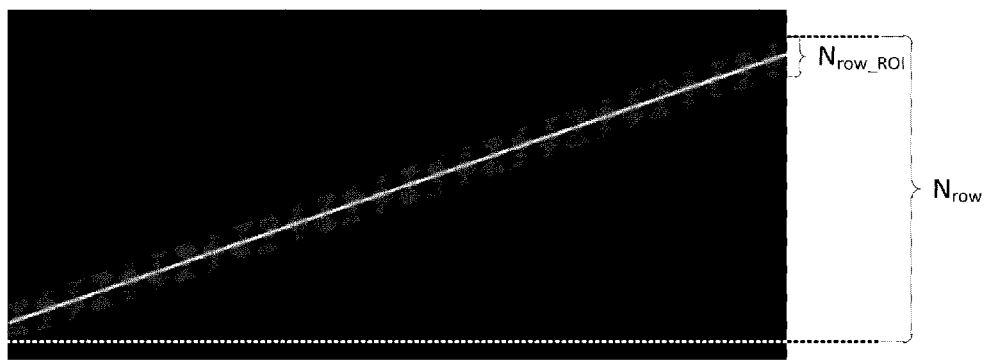
FIG. 20 is an example of an image captured by a sensor for a laser triangulation application.

FIG. 20 shows an example of an image captured by 3D laser triangulation application similar to image 330 of FIG. 3A. As described above, in some approaches, only rectangular ROIs are allowed. Accordingly, in order to read the image shown in FIG. 20, approximately the whole image would need to be read-out in order to obtain the pixels belonging to the laser line. This process takes $N_{row} \times T_{row}$ seconds, where $N_{row}$ is the number of rows containing information and $T_{row}$ the time required to readout a complete row of pixels. However, the information of interest is condensed in an interval of few pixel rows $N_{row\_ROI}$ around the maximum value along the column.

According to the embodiment of the present invention the row number for each column of the pixels containing the relevant information (i.e. pixels of the ROI) is possible to be calculated in the time given in the following equation 1:

$$T_{fast\_ro}+T_{proc}+T_{re\text{-}prog}+N_{row\_ROI} \times T_{row} N_{row} \times T_{row} \quad \text{(equation 1)}$$

Wherein $T_{fast\_ro}$ is a time period spent for fast reading-out of the pixels for the purpose of determining the ROI by the first read-out circuit, $T_{proc}$ and $T_{re\text{-}prog}$ are time periods defined above spent for determining the ROI and re-programming the sensor array 1910, respectively.

Thus, an improvement factor K delivered by this embodiment of the present invention compared with the prior art may be estimated as follows:

$$K(T_{fast\_ro}+T_{proc}+T_{re-prog}+N_{row\_ROI} \times T_{row}) = \quad \text{(equation 2)}$$
$$N_{row} \times T_{row}$$

$$K = \frac{N_{row} \times T_{row}}{T_{fast\_ro}+T_{proc}+T_{re-prog}+N_{row\_ROI} \times T_{row}} \quad \text{(equation 3)}$$

Reasonable values for the parameters above in a 3D laser triangulation application are:

$$N_{row}=512$$

$$N_{row\_ROI}=16$$

$$T_{row}=2 \text{ } \mu s$$

$$T_{fast\_ro}+T_{proc}+T_{re\text{-}prog}=10 \text{ } \mu s$$

These example values result in a considerably high improvement factor of $K \approx 25$. It is noted that these parameter values are only exemplary and that, as is clear to those skilled in the art, other values may be selected and applied in accordance with the requirements of the application, the size of the sensor array, etc. The improvement factor defines the increase in frame-rate using the accurate (second) read-out channel that is possible to achieve by using the present invention compared to the prior art.

Figure 21:
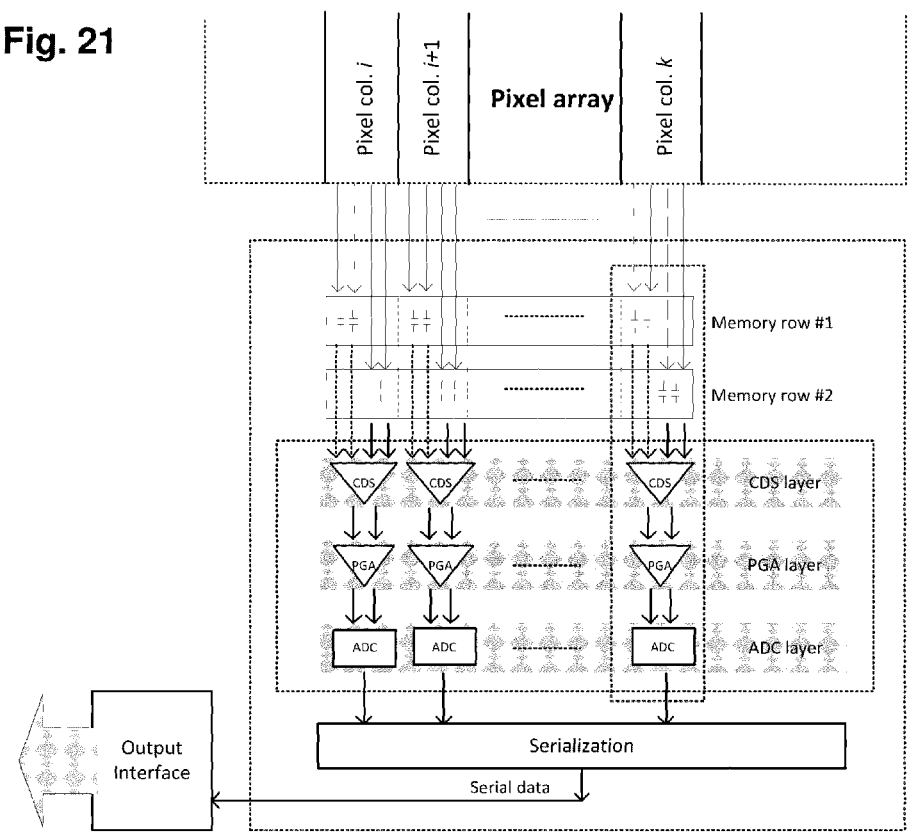
FIG. 21 is a block diagram of an example of a digital column-parallel read-out channel.

FIG. 21 illustrates an example of a structure of a read-out channel (circuitry). In sensors with one Analogue-to-Digital Converter (ADC) per column, pixel data is alternatively stored in two analogue memories (memory row #1 and memory row#2), each of them composed of a row of capacitors. In each memory line there are two capacitors per pixel: one for storing the pixel reset value N' and the other for the signal S with noise N, resulting in a value S+N. Once a memory set is filled, its capacitors are connected to a layer of correlated double-sampling (CDS) circuits, while the next pixel row is downloaded into the second memory row. The CDS cancels correlated errors between S+N and N'. Afterwards, the signal is passed to a Programmable Gain Amplifier (PGA) where it is amplified before converting it to a digital signal at the ADC. The digitized data is serialized and output to an interface block in order to transmit the image flow out of the sensor. This or similar read-out architecture may be used for any of the first or second read-out circuitry. However, it is noted that the read-out circuitry may also have any other structure and may work without the noise compensation provided by CDS—the present invention is not limited by the particular structure of the read-out circuit.

Figure 22:
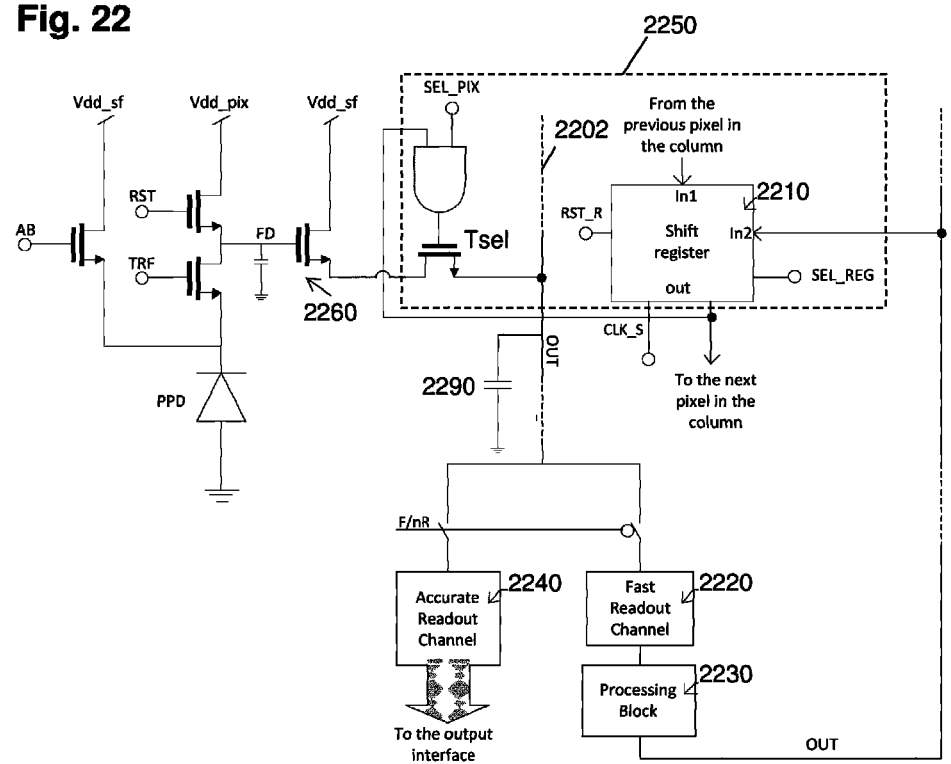
FIG. 22 is a circuit diagram illustrating a modified 5T pixel architecture enabling an automatic ROI determination.

In order to enable the faster reading-out of pixels for determining the ROI, programming the ROI and the slower and more accurate reading ROI reading-out, the exemplary 5T (cf. FIG. 5) pixel architecture can be modified as shown in FIG. 22.

The modified pixel architecture is based on the original 5T architecture plus a modified control of the selection signal (denoted as SEL_PIX) which is generated (controlled) by means of the fast (first) read-out channel 1920 and a processing block 2230 placed at each column. As described above, the pixel selection signal SEL_PIX is typically generated by the row-selection circuit and is applied directly to the selection transistor for all pixels in a row, thereby selecting the row. It is to be noted that a sensor array may also be built to select columns instead of rows.

The selection of all pixels in a row by opening the selection transistor ensures that all pixels in the row are downloaded in parallel using the accurate (second) readout channel 2240 in this embodiment. In this embodiment of the present invention, the activation of the selection transistor Tsel is controlled by the logic module 2250 showed in FIG. 22. Said module is designed so that SEL_PIX is only applied to those pixels belonging to the ROI identified by an indicator (such as a flag) stored in a per-pixel one-bit shifting register 2210. Examples of such circuitry have been shown above. It is assumed in this embodiment that the one-bit memory 1430, 730 in FIGS. 14 and 730 being a part of the control means is included within the functional block of the shift register 2210. As this memory means is set individually for each pixel, it is possible to define randomly, i.e. arbitrarily shaped ROIs and to download only the pixels contained in said predetermined ROIs. The remaining functionality and inputs/outputs of the control block 2250 can correspond to those of the control means 710 and the elements thereof from the embodiments described with reference to FIGS. 7, 11, 13, and 14.

Figure 2:
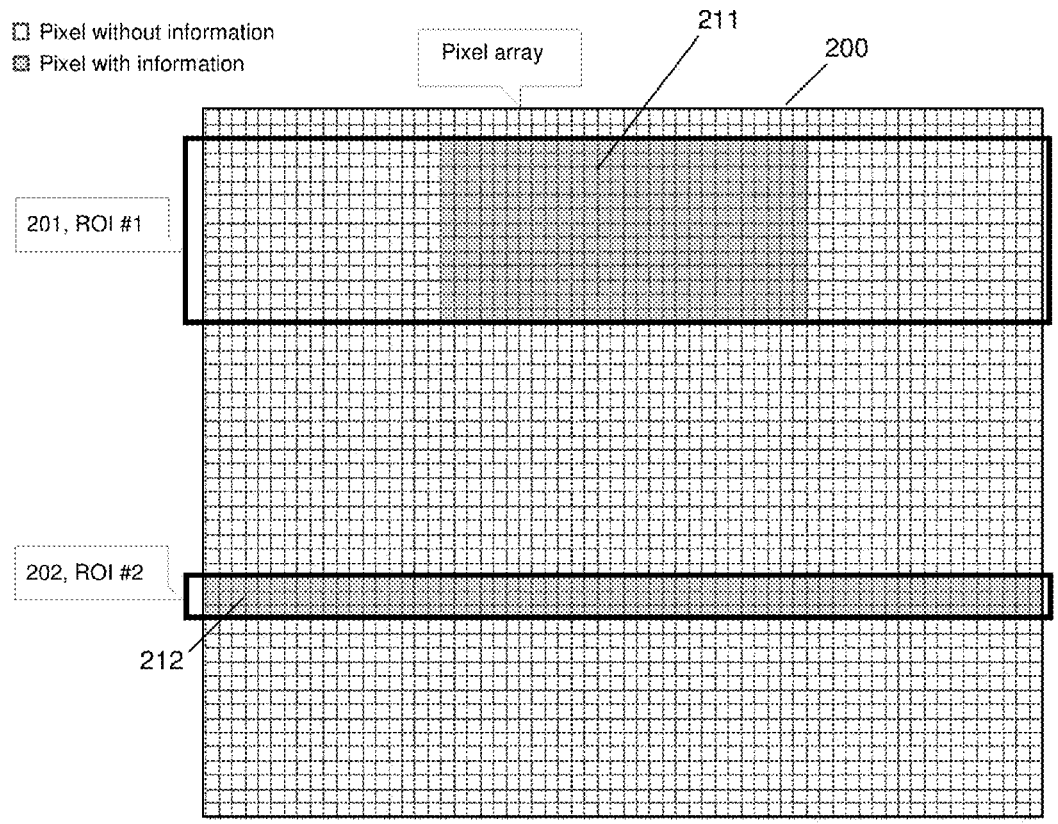
Figure 2:
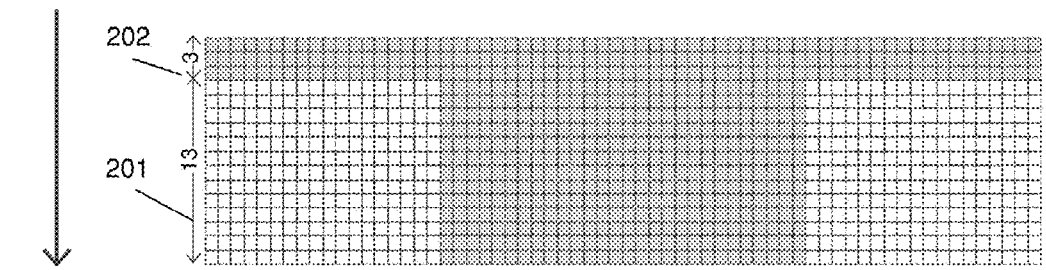

It is to be noted that the present embodiment may rely on the pixel architecture including the control means shown in any of the previously described embodiments. However, this is not to limit the present invention. In general, the present embodiment may work with any kind of architecture supporting storing in any form an identification of a ROI and reading-out only the pixels from the ROI. For instance, this embodiment may also work with the less flexible ROI definition approaches such as rectangular-ROI described with reference to FIG. 2.

In this embodiment of the invention, the region of interest is defined automatically by processing the entire acquired image. In order to realize this processing in the shortest time possible, the present invention provides a fast (first) read-out channel 2220 allowing to read-out the entire image much faster than the usual approaches and using a non-destructive readout. Said faster read out is achieved by using the fast read-out channel 2220 whose reduced accuracy is enough to determine the ROI, but would likely be insufficient for reading-out the pixel values for further processing.

Alternatively to the fast readout channel in the present invention, faster readout may be achieved, for instance, by shortening the integration time and/or reducing the time allocated for downloading the analog pixel data from the pixel to the analogue memories stopping the download process before is completed, and/or reducing the counting time of the ADC or, in other words limiting the time allocated to the A/D conversion to the required to obtain only the most significant bits of the pixel data, and/or using multiple read-out channels downloading in parallel several pixel rows.

Furthermore, a processing block 2230 which may be provided per column is configured to process the signal provided by the fast read-out channel 2220 and to detect which pixels fulfil one or several conditions, marking them to become a part of the ROI. The processing block 2230 is also configured to update the content of the in-pixel shift register block 2210.

In summary, the circuitry for determining the ROI advantageously has the processing unit configured to determine the ROI by detecting among the pixel values acquired by the first read-out circuitry those pixels which belong to the ROI based on a predefined condition, and to provide the determined ROI to the second read-out circuitry.

Moreover, the processing unit may include a comparator for detecting as pixels belonging to the ROI those pixels the value of which exceeds a predefined threshold.

The determining of the ROI is advantageously performed for each frame captured by the sensor array. However, in general, the present invention is not limited thereto and for some applications it may be advantageous to determine ROI only for a subset of all frames, for instance regularly with a predetermined or predefined time period (number of frames). This alternative may be advantageous for reducing the complexity and thus also the time necessary for determining the ROI.

Moreover, in order to make use of the adaptive ROI programming, an in-pixel shift-register 2210 allows reading-out a different ROI per column containing relevant information. As shown in above ROI programming embodiments, the programmable ROI definition may be provided in a flexible manner enabling different ROIs for different columns or by providing a ROI equal in size but not in position within different columns. The shift register block 2210 has two inputs, the first input (In1) for receiving the output of the shift register of the pixel in the adjacent row above (alternatively below) the current row. The second input (In2) serves for receiving data from the processing block 2230 shown in FIG. 22 at the bottom of the column. The processing block 2230 is configured to determine (update) and provide the ROI identification to the shift register block 2210 as will be described below in more detail.

Another signal input for the source selection signal SEL_REG selects the source of the data that is placed at the output of the shift register. For instance, the value of the source selection signal SEL_REG=0 may configure the pixel to use the input In1 from the shift register of the preceding pixel in the same column as the current pixel whereas SEL_INPUT=1 may configure the pixel to use the signal from the processing block 2230. The clock signal CLK_S controls the capturing of the new data. In particular, during the rising edge of the clock signal CLK_S, the data is acquired from the selected input In1 or In2 (according to the value of the source selection signal). At the falling edge, the acquired data is provided (set) to the output "out" of the shift register. The source selection signal SEL_REG is distributed to all pixels in a row so that the acquisition and writing of the data is performed simultaneously for all pixels in the row. This architecture of the shift register ensures reading out of only the pixels which belong to the ROI determined adaptively by means of the fast read-out channel (read-out circuitry) 2230.

In summary, a circuitry for configuring a region of interest within pixels of a sensor array is provided. The ROI includes one or more pixels to be read-out from the sensor array. The circuitry comprises a ROI storage means for storing a ROI indication indicating that a pixel belongs to the region of interest of the sensor array; and a control means for writing into the ROI storage means of the pixel the ROI indication in accordance with an input provided from the processing unit of the circuitry according to any of the examples and embodiments as described above.

Moreover, a read-out circuitry is provided for reading-out from a sensor array pixels of a region of interest. The read-out circuitry comprising: a signal storage means for storing per pixel a signal detected by the sensor; a ROI storage means for storing a ROI indication indicating that a pixel belongs to the region of interest of the sensor array in accordance with the input provided from the circuitry according to any of the embodiments and examples described above; a selection circuit for selecting at least one pixel to be read-out, the selection circuit being configured to read-out only pixels with the ROI indication indicating that said pixels belong to the region of interest; and a second read-out circuit for reading-out the signal storage means of pixels selected.

Furthermore, a sensor array circuitry for reading out a region of interest of a sensor array is provided. The sensor array circuitry comprises the circuitry for determining a region of interest according to any of the examples and embodiments described above, the circuitry for configuring the determined ROI as described above, and the circuitry for reading-out the pixels from the configured ROI as described above.

The sensor array circuitry advantageously further comprises a shift register, which includes a first input (In1) for receiving a signal from a ROI storage means of another pixel preceding said pixel within a line of pixels; a second input (In2) for receiving a signal provided by the processing block of the circuitry according to any of examples and embodiments described above; a control input for receiving a source selection signal (SEL_REG) controlling whether the first input or the second input is active; and an output (out) for shifting a signal received to a ROI storage of another pixel following said pixel within the line of pixels when the control input selects the first input, and for storing the signal received at the second input when the second input is selected. The selection circuit is preferably configured for selecting the pixels to be read-out in accordance with the signal output from the shift register.

Figure 23:
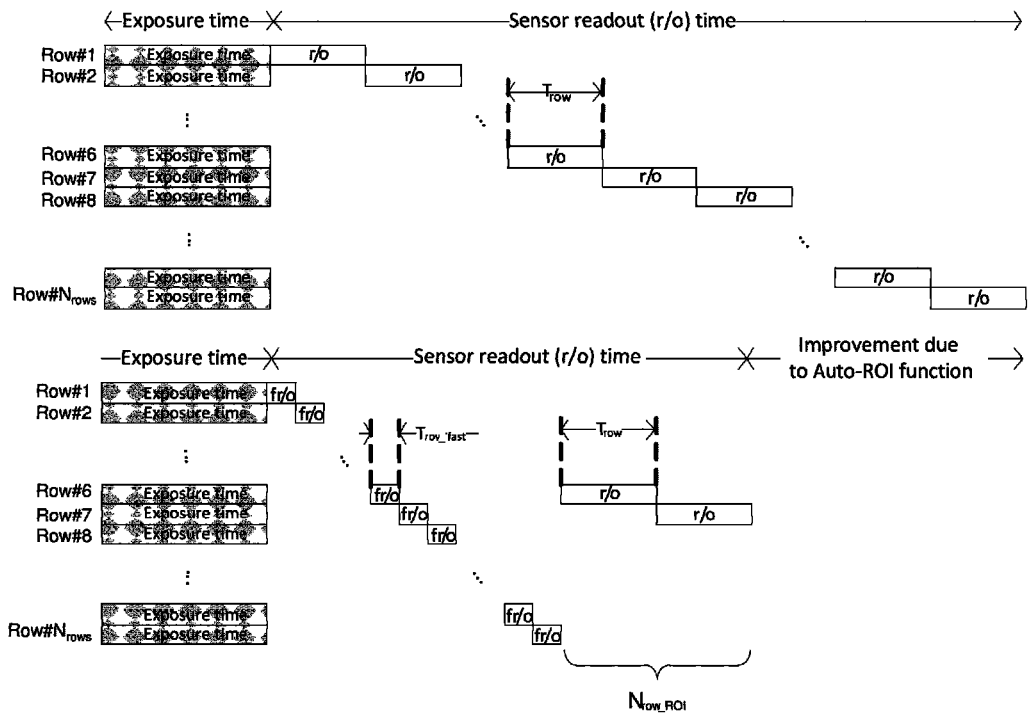
FIG. 23 is a time diagram schematically illustrating the sensor readout time in a well-known reading-out approaches and according to an embodiment of the present invention.

The selection circuit may be configured to select the pixels to be read-out only in accordance with the signal output from the shift register. The combination of the ROI determining circuitry with the second read-out circuitry which is configured to read-out only the pixels belonging to the determined ROI enables to discard the information irrelevant for the application, thereby reducing the amount of data to be read-out leading to a substantial increase of the frame rate. The time savings are schematically illustrated in FIG. 23. The upper part or FIG. 23 shows in the horizontal direction time required for exposition and reading-out (r/o) of a sensor array by a usual image sensor circuitry. The vertical direction of the diagram represents the particular rows of the sensor array. The upper part of FIG. 23 corresponds to the time diagram of FIG. 10. The lower part of FIG. 23 illustrates the time diagram resulting from employment of a ROI determining and reading-out circuitry as described above. In particular, the sensor read-out time includes two portions, a first portion for fast reading out of the sensor array for the purpose of determining the ROI and a second portion for reading out only the ROI pixels. The first portion includes row-wise fast reading-out (fr/o) of all pixels in the rows 1 to $N_{rows}$ with $N_{rows}$ being the number of rows of the sensor array. As can be seen from the figure, the first, fast reading-out per row is shorter than the normal reading-out of a row as shown in the upper part. The second portion of the sensor reading-out only includes reading out the rows of the ROI, resulting in reading out only $N_{row\_ROI}$ (number of rows in the ROI) rows. As also illustrated in the figure, the second reading out (r/o) of the ROI pixels is slower than the fast reading-out and corresponds to the usual reading-out period as also shown in the upper part of FIG. 23. Since the first portion includes the fast reading-out and the second portion includes only the reading-out of relevant pixels (ROI pixels), the entire reading-out and ROI adaptation process is shorter than a complete reading-out of the sensor array. This is illustrated in FIG. 23 by the time period denoted "improvement due to auto-ROI function".

The speed of the read-out channel in the prior art defines the ultimate limit in the time required to download the information stored in a pixel from the pixel FD node to the (analogue) memory which can be placed at the bottom of the pixel column, inside the digital read-out channel 2240. Said pixel download time is determined by the driving capability of the source-follower buffer transistor 2260 inside the pixel and the equivalent capacitance 2290 of the column output line. Increasing the driving capability to fasten the pixel download requires larger source-follower buffer, which increases pixel size and decreases pixel sensitivity. To compensate both drawbacks pixel size is to be increased, which sets a clear trade-off between the maximum achievable read-out speed for a given pixel size.

In order to decouple read-out speed and the pixel size, according to an embodiment of the present invention the reading of the optically generated charge stored in the floating diffusion node FD is performed by using a fast read-out channel operating in a current mode as opposed to the voltage mode read-out typically used in the conventional readout channels. On the other hand, the voltage-mode read-out circuitry may advantageously still be used for the accurate readout channel 2240.

In the current mode, similar to the voltage mode, the signal stored in the capacitive storage FD is read-out and stored in the analog memory at the bottom of the column. However, while in voltage mode the speed of downloading the signal from the FD node to the analog memory depends on the driving capability of the source-follower buffer transistor inside the pixel, in current mode depends on the driving capability of a block which is not inside the pixel but at the bottom of the column; therefore it can be made much stronger without impacting pixel size or impacting noticeably to overall sensor power consumption.

Reading pixels in the current mode has several advantages compared with the traditional voltage-mode reading. First, as explained above, the speed of downloading the data from the pixel FD node to the analogue (capacitive) memory is not controlled by the driver in the pixel but by the readout circuitry which is at the bottom of the column and is common to all pixels in the column. This make possible increasing the speed without increasing the driving capability in the pixel and, therefore, keeping (maintaining) the pixel size.

In summary, advantageously, the first read-out circuitry of the circuit for determining the ROI works in current mode.

Second, when several pixels in one column are readout simultaneously (by selecting all of them together) the resulting current is the sum of the currents from all of the selected pixels. In contrast, the resulting voltage from the reading of all selected pixels corresponds to the average of the output voltages from the particular selected pixels as happens with the regular accurate voltage-mode readout channels. This difference between the current mode and the voltage mode provides for several advantages when applying the current mode or the fast read-out channel.

In applications like 3D laser triangulation, the ROI position in each column may be detected as the position containing pixels with a higher intensity within the column. Accordingly, the reading-out of the image in groups of pixels by adding their output current will result, on one hand, in a reduction in the total number of rows to be readout compared with reading out pixel by pixel, and on the other hand, on an improvement of the signal-to-noise ratio, thus simplifying the recognition of the ROI versus the background.

Moreover, more current means higher speed. Thus, the reading of pixels in groups allows increasing the speed of the reading-out and therefore also increasing the frame-rate when compared to reading-out in a row-by-row basis.

The current-mode circuitry preferably comprises a driver transistor of the PMOS type for providing a pixel current Ipix based on signal stored in a capacitive memory FD to the processing unit.

Figure 24:
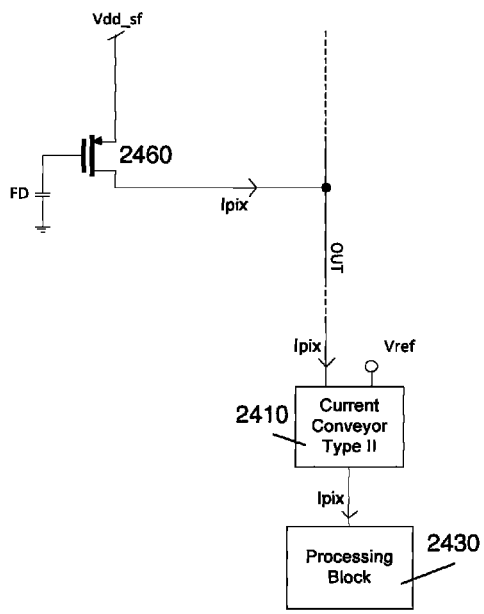
FIG. 24 is a circuit diagram of an exemplary fast read-out channel.

FIG. 24 shows an example of architecture of the fast readout channel which may be employed in this embodiment of the present invention. The current-mode read-out is achieved by biasing the transistor 2260 in ohmic region instead of in saturation region.

In FIG. 24, the driver transistor 2460 in the pixel has been changed to a PMOS type transistor compared to FIG. 22 in which the transistor was an NMOS transistor. This is convenient because, otherwise, the dark pixels (which form the majority in the images in 3D laser triangulation, cf. FIG. 20) would likely produce a rather high output current which would hide the information of the bright pixels. Accordingly, lower current would be produced which would make it difficult to download multiple rows at the same time in order to accelerate the ROI detection. In addition, if many pixels inject a significant current into the column, the power consumption may increase which may compromise the sensor integrity and/or produce some non-ideal behaviours. However, it is noted that even when PMOS transistor provides the above benefits, the present invention is not to be limited by this implementation and an NMOS transistor may also be employed.

Using a PMOS type transistor in the pixel driver of the current-mode fast read-out channel makes bright pixels output a higher current. In this condition, the pixel driver transistor can be operated in such a way that dark pixels inject a very small current which helps to determine the ROI by better distinguishing between the bright and dark pixels.

In this mode, the current Ipix provided by the driver transistor 2460 is given by the following equation:

$$I_{pix} = \beta_{ohmic}\left[(V_{SG} - V_T)V_{SD} - \frac{V_{SD}^2}{2}\right] = \quad \text{(equation 4)}$$

$$\beta_{ohmic}\left[(V_S - V_{FD} - V_T)V_{SD} - \frac{V_{SD}^2}{2}\right]$$

in which $V_{SG}$ is the source-to-gate voltage between the source node and the gate node, $V_T$ is the transistor threshold voltage, $V_{SD}$ is the source-to-drain voltage, $V_S$ is the source voltage, $V_{FD}$ is a voltage (the signal) stored in the floating diffusion node FD and $\beta_{ohmic}$ is the ohmic bias applied. Hence, if both drain voltage ($V_D$) and source voltage ($V_S$) are constant, the current delivered by a pixel is determined by the gate voltage ($V_G$) which has a linear relation with $V_{FD}$.

In order to keep the voltage in the source of the driver transistor 2460 constant, a current conveyor 2410 is provided. The current conveyor here is a circuit component with two inputs, which delivers the same current Ipix present in one of its inputs whilst it keeps the voltage difference between both inputs virtually equal to zero.

Then, the equation 4 becomes as follows for the circuit of FIG. 24:

$$I_{pix} = g\Delta V_{FD} + I_{OFF},$$

wherein $\Delta V_{FD}$ is the increment of voltage as a consequence of the photo-generated charge. i.e. the acquired signal, and can be expressed as follows:

$$\Delta V_{FD} = V_{FD} - V_{FD0}$$

Where $V_{FD0}$ represents the voltage stored in the FD node after reset, which is the initial voltage in the FD node before the exposure.

$I_{OFF}$ is an offset of current independent from the pixel signal, and g is a gain.

By comparison with equation 4, g corresponds to:

$$g = \beta_{ohmic}(V_{dd\_sf} - V_{ref}) \quad \text{(equation 5)}$$

wherein $V_{dd\_sf}$ is the source voltage of the driver transistor 2460 and $V_{ref}$ is a reference voltage at the second input of the current conveyor 2410.

Accordingly, $I_{OFF}$ becomes $$I_{OFF} = \beta_{ohmic}\left[\frac{V_{dd\_sf} - V_{ref}}{2} - V_{FD0} - V_T\right](V_{dd\_sf} - V_{ref}) \quad \text{(equation 6)}$$

As explained before the current-mode fast read-out channel provides a manner for further increasing of the read-out speed if several rows are selected simultaneously. The amount of the rows to be read-out in parallel depends on the application. In the particular case of the 3D laser triangulation, this number would be below 4, which is a typical laser width. With this technique of selecting and reading-out simultaneously a plurality of rows, the improvement factor K would go up to 50 if the rows are shorted in pairs (if always two rows are read-out in parallel).

The processing block 2430 correspond (or is a part of) the processing unit 2230 of FIG. 22. It serves for finding out the ROI pixels. The detection of the ROI pixels may be performed, for instance by detecting the bright pixels in the case of the laser triangulation application in which the image captures is basically a dark image with a laser line corresponding to brighter pixels. However, other applications may require another detection mechanism and thus also other kind of processing unit. The specific architecture of the processing block is thus not extensively treated herein since it essentially depends on the application. However, ROI detection mechanisms are well-known in the prior art from various real-time image and video processing applications.

Figure 25:
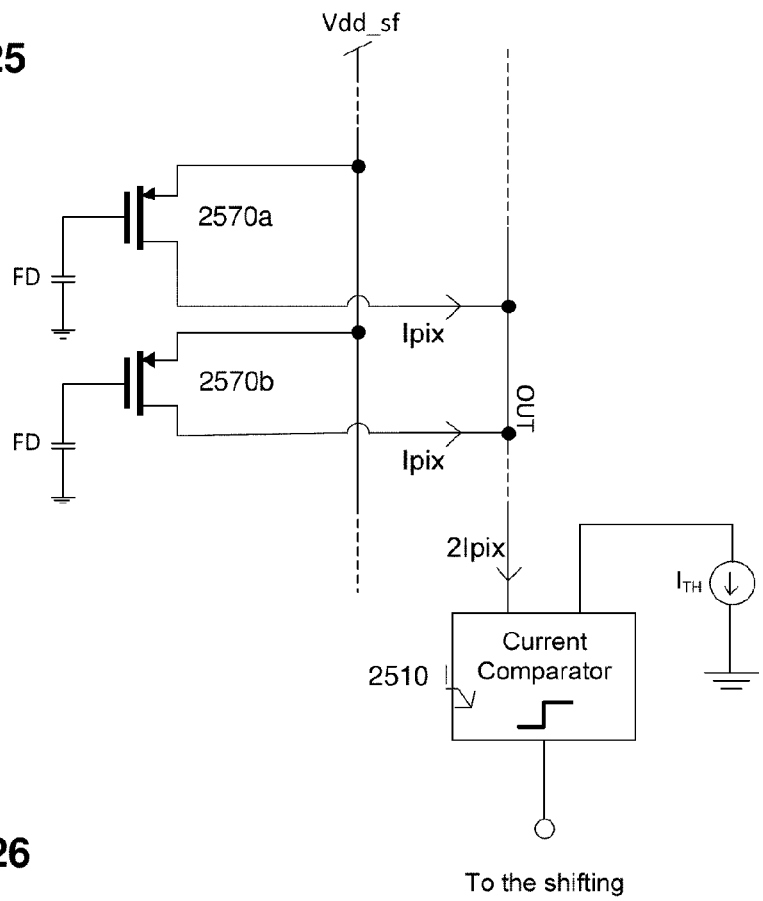
FIG. 25 is a circuit diagram of an exemplary of a fast read-out channel with multiple-row processing particularly suitable for 3D laser triangulation application.

In the particular case of the 3D laser triangulation application, relevant information (the laser line) is represented by a peak of very bright pixels (low-level signal) whilst the background is often almost black (high-level signal). Hence, a simple current comparator may suffice in many cases as processing block to find out the ROI pixels. In addition, the current comparator also benefits of short-circuiting several rows for noise reduction and speed improvement. Moreover, given that the current comparator fixes the voltage difference amongst its inputs, the current conveyor is not required. As a result, a simple circuit can play the role of both fast read-out channel 2220 and the processing block 2230 as shown in FIG. 25.

Advantageously, the circuitry for determining ROI comprises a current comparator. The current comparator may be implemented within the processing unit. However, the present invention is not limited to such arrangement. It is noted that the functional blocks of the fast read-out channel and the processing unit may be merged physically in one block which detects the ROI during the readout itself.

The first read-out circuitry is preferably configured to read-out two rows of pixels of the sensor array in parallel.

Alternatively, or in addition, the first read-out circuitry may be implemented in each column by means of a driver transistor per row providing a sum of currents from the pixels of the respective two rows to the comparator which is adapted to compare the sum with a threshold current $I_{TH}$.

FIG. 25 shows a view on an example of the first read-out channel combined with a processing unit for processing two rows of a single column at once, i.e. for reading out two rows of pixels simultaneously for the purpose of determining the ROI. In particular, two capacitive memories FD are provided for the respective two pixels of the same column. The memories are read-out by the respective driver transistor 2570a and 22570b resulting in the respective read-out currents Ipixa and Ipixb which are summed up resulting in a sum current 2Ipix inputted to the comparator 2510, of which the other input is a threshold current $I_{TH}$ which determines whether the two pixels belong to the ROI or not. The output of the comparator may then be directly connected to the second input In2 of the shift register as described above.

In the particular case of the 3D laser triangulation application, it is possible to deliver a low-precision laser location in the row as the result provided by the comparator 2510. The accuracy of this result is possibly low in terms of the number of pixels. Nevertheless, given that the comparator 2510 processes the entire image, relative accuracy is comparable to that obtained with the prior art for a reasonable number of pixels. This low-precision result can be obtained at a high speed, since the readout of the ROI is not required in this case.

Image acquisition in a sensor using the modified pixel and/or read-out channel architecture works as in the prior art. In fact, the present invention and in particular the ROI determining is applicable to any CMOS pixel regardless of its topology (pinned or conventional photodiode) and number of transistors.

During the image read-out phase the operation varies according to the above description. In the following, an example of operation of the above described pixel architecture is described.

The photo-diode PPD is operated as usual and the charge integrated by the PPD is transferred to the capacitive (analogue) memory implemented here by means of a floating diffusion node FD. The overall control circuit configures the sensor array into the fast readout mode by activating the signal F/nR as can be seen in FIG. 22. This configuration, on one hand, makes the sensor control circuitry to program the pixel operation in the fast read-out mode by biasing the driver transistor 2260 in the ohmic mode. On the other hand, the fast read-out channel 2220 is thereby connected to the column line 2202.

By means of the source selection signal SEL_REG the entire shift register is set to logic value 1, letting the pixel selection signal SEL_PIX control the connection of rows to the columns of the sensor. The overall control of the sensor handles then the pixel selection signal SEL_PIX so that all rows are sequentially connected to the fast read-out channel 2220. Then, each column line delivers a current proportional to the signal acquired by the pixel selected. The processing block 2230 processes the signal delivered by the fast read-out channel 2220, in order to detect which rows for each column match the condition or conditions defined to distinguish whether a pixel belongs to the ROI.

The output OUT of the processing unit 2230 is a digital signal which is fed back to the pixel array and which indicates that the pixel connected to the column in the current moment is a part of the ROI by writing a logic value of 1 into the shift register 2210 input In2 in the position given by the source selection signal SEL_REG. The source selection signal SEL_REG is timed in the same way as SEL_PIX. However, alternatively, a programmable offset between the source selection signal SEL_REG and pixel selection signal SEL_PIX is possible so that the ROI can contain some pixels before or after the actual one. This process is performed in parallel for all the columns in the image.

The overall control then configures the sensor into the ROI read-out mode by resetting the signal F/nR. In addition, the driver transistor 2260 is biased in saturation region, so that it works like a source follower, as in the prior art. The source selection signal SEL_REG signal is not activated during the ROI readout so that input In1 is active rather than the input In2 in the shift register 2210.

The ROI determined in the fast read-out mode is then read-out in the ROI read-out mode via the accurate read-out channel 2240.

Figure 26:
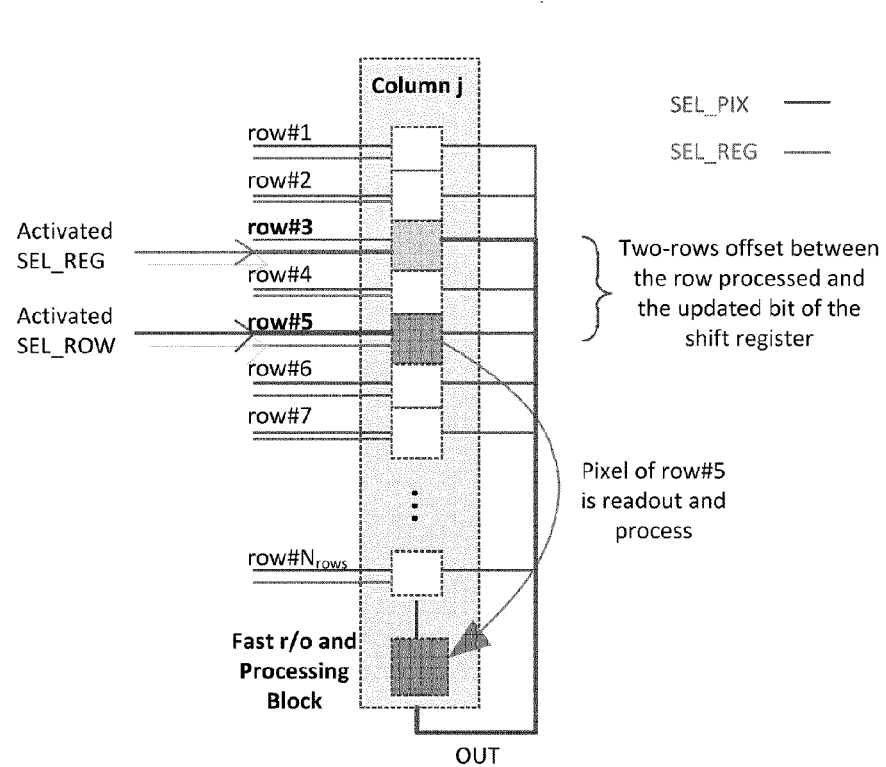
FIG. 26 is a schematic drawing illustrating pipelined ROI determination within one sensor array column.
Figure 27:
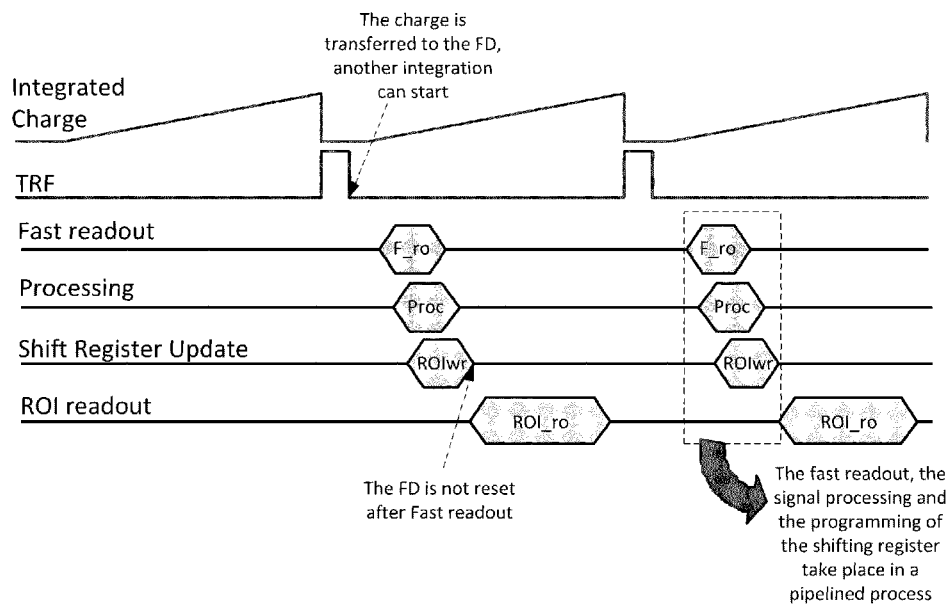
FIG. 27 is a time diagram illustrating the possibility of pipelining the operations related to ROI determination and storing.

FIGS. 26 and 27 illustrate an embodiment of the present invention, in which the exposure time can overlap with both the fast (first) read-out including processing and updating of the shift register 2210 and the ROI (second) read-out. Accordingly, the fast read-out, the processing and the update of the shift register 2210 are accomplished in a pipelined manner in order to increase the overall image sensor speed.

In particular, FIG. 26 shows operations regarding a single column j of pixels including pixel rows 1 to $N_{rows}$. In the current step, the pixel in the fifth row #5 is read-out by the fast read-out circuitry. This is performed by means of selecting the pixel row by the pixel selection signal SEL_PIX. In parallel, the ROI storage of the pixel of the third row #3 is updated by writing the appropriate value (for instance, logic 1 if the pixel is the first ROI pixel in the column or logic 0 when the pixel is not the first pixel in the ROI) therein. Thus, FIG. 26 illustrates time shift between the determining of the ROI and the programming of the ROI into the shift register storage. This enables performing these two operations in a pipelined manner. Moreover, the ROI reading-out by the accurate read-out circuit may also be pipelined. The ROI reading out can be performed when the ROI writing (programming) operation terminated.

FIG. 27 shows the pipelined processing in a time diagram. FIG. 27 shows the analogue integrated charge which is on the photo-electric element PPD during the time illustrated by the horizontal direction. As soon as the charge is integrated, it is transferred to the analogue memory FD. The transfer of charge from PPD to FD is performed for all rows of the column j controlled by the transfer signal TRF. After the transfer, the fast read-out procedure may be performed for all rows in the column j. While some rows are still read (F ro) by the fast read-out circuitry, the rows already read-out may be processed (Proc) by the processing unit to determine the ROI and those rows already processed may be programmed into the sensor array shift registers (ROIwr). As can be seen, the above three operations namely the fast reading-out, the processing and the ROI writing may be performed pipelined, i.e. partially in parallel meaning that these steps are applied in parallel to the same column but shifted with respect to the rows processed by the particular steps. Then, without resetting the FD, the accurate reading out (ROI_ro) is performed. Such pipelining may further speed up the automatic ROI operation.

Summarizing, in addition to providing a ROI programming circuit and a ROI reading-out circuit, the present invention provides a modified CMOS sensor architecture to implement the auto-ROI function, by which the sensor automatically calculates a ROI per column or per image before actually reading-out the actual image from the sensor. The modified pixel architecture is capable of implementing both the fast, current-mode read-out and the accurate, voltage-mode ROI storage read-out. The inclusion of processing circuitry per column to automatically obtain the ROI position from the current delivered by the fast readout channel enables efficient automatic ROI updating. This is particularly suitable for applications of laser triangulation sensors. However, it is not limited thereby and the present application is in general applicable to any kind of sensing (imaging) application. The laser triangulation application allows for some simplified and efficient implementations such as the above described architecture for low-accuracy calculation of the laser peak for triangulation sensors including a comparator and reading out a plurality of rows in parallel.

Figure 28:
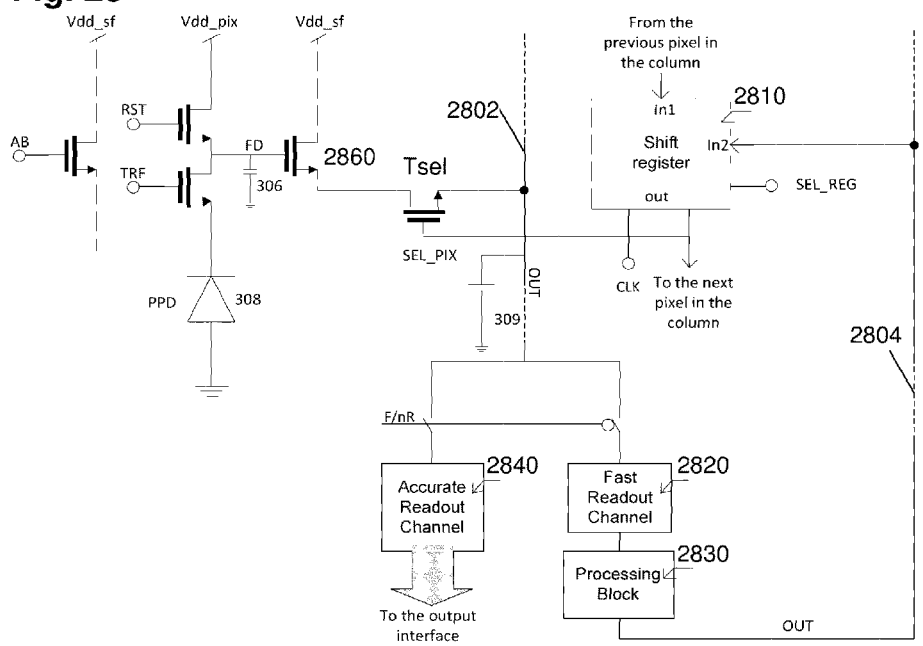
FIG. 28 is a circuit diagram illustrating another example of a pixel architecture with a simplified pixel selection.

It is to be noted that the implementation of the ROI determining is not limited to the example architecture of FIG. 22. For instance, an optimization of the pixel architecture shown in FIG. 22 is illustrated in FIG. 28. Accordingly, the saving of some logic inside the pixel is possible.

FIG. 28 shows the modified architecture which, compared to the pixel architecture of FIG. 22, allows saving of the AND gate controlling the pixel selection, i.e. controlling the activation of the selection transistor Tsel. The principle of operation of this pixel is similar to the original concept of FIG. 22 in connection with the embodiment described above with reference to FIG. 14. The programming of the ROI is the same as described above, but when (according to FIG. 28) the clock signal CLK is activated in order to transfer the content of the one-bit memory to the shift register, the read-out process starts, since the output of the shift register (a logic 1 for the first pixel of the ROI) at the same time activates the selection transistor of the first pixel of each ROI.

Then, as in the original architecture, pulsing the clock signal CLK (corresponding to CLK_R in FIG. 14), the first pixel of every column is sent to the following below pixel, disconnecting thereby the first pixel from the column line and connecting the later. Using this method, the same results are achieved while saving one logic gate (in all pixels). In this case when the AND gate is left out from the pixel architecture, only the first pixel of each ROI may contain a logic 1, since otherwise, several rows would be shorted in the output line. Accordingly, the reduced architecture without the AND gate is only suitable for the architectures in which the ROI indication is stored by means of the ROI memory means of a first pixel in the column being set to logic value of 1 and by means of shifting the value as long as the below pixels also belong to the ROI.

This embodiment of the present invention works as follows. The photo-diode PPD is operated as usual, and the charge integrated within it is transferred to the FD node (analogue memory) when the exposure time terminates. The overall control sets the sensor in the fast read-out mode by activating the signal F/nR. This makes the sensor control circuitry to program the pixel operation in the fast mode, biasing the driver transistor as also in the example above in the ohmic mode and connect the fast readout channel to the column line.

The entire shift-register (of all pixels) 2810 is set to logic 0 to initialize. Then all source selecting SEL_REG signals in the entire sensor array are set to logic 0 and a complete pulse (rise and fall) is applied to the clock "CLK" signal at the input of the shift register. After this process, all selection transistors Tsel will be inactive, and any driver transistor 2860 will be unconnected to the column output line 2802. The source selection signal SEL_REG will then configure the shift register module 2810 to acquire the data from the In1 input. This configures the shift register modules 2810 in every pixel as a complete shift register per column.

The input In1 of the first row is fixed to "1" in order to program a logic 1 into the shift register 2810 and a pulse is applied to CLK input of the shift registers in the first row. This activates the Tsel transistors and connects the driver transistor 2860 of the first row to the column line 2802. Once the first logic 1 has been injected into the shift register 2810, the In1 input of the first row is changed to "0" in order to avoid introducing any other logic 1 into the shift register 2810 during the frame read-out of the first frame.

The fast readout channel 2820 reads the data corresponding to the first row of pixels and the processing block 2830 processes the data from such first pixel row. Then the source selection signal SEL_REG of the first row is switched to allow the shift register capturing the data from the input column 2804. These data will not be captured until CLK signal for such row rises, and is not set to the output of the shift register until the CLK signal falls. Every new time needed to readout a row in the fast mode (T_row_fast), the process is repeated for the other, next row. Then, the row is connected to the output and its data are readout by the fast read-out circuit 2820. After this, every row is reconfigured to read the data from the input column 2804 and its clock (CLK) remain static, avoiding capturing any new data into the shift register module.

The processing blocks 2830 processes the reading information and takes the decision on whether one pixel in a row is interesting to be considered as part of the ROI or not. If this block detects the beginning of the ROI, it sets the ROI storage of the detected beginning pixel to logic 1 in the column input 2804. At the same time, a number of rows above as defined by the user, is activated rising the corresponding clock signal CLK only for such rows. The previous results in writing the pointer that marks the ROI beginning in the shift register blocks, but this data do not connect these respective pixels to the output until the CLK clock signal edge falls. This process continues row by row until the last row is read-out in the fast read-out mode. As soon as the fast read-out phase is finished, all CLK signals in all rows fall and the corresponding pixels are connected to the columns 2402. This is the end of the fast read-out stage.

When the fast read-out phase is terminated, the overall control of the sensor array configures the sensor into the ROI read-out mode (the accurate read-out mode). In addition, the driver transistor 2860 is biased in its saturation region, so that it works like a source follower. The source selection signal SEL_REG is not activated during the ROI read-out phase. The pixels from the ROI determined (calculated) as described above is read-out via the accurate read-out channel 2840. For the normal operation, the source selection signal SEL_REG is set to select the first input In1 in the entire array. This setting configures the shift register modules 2810 as a single column size shift register. At the same time, the first input In1 of the shift register 2810 for the first column is set to "0", in order to avoid activating of other pixels different to those selected as belonging to the ROI.

Every $T_{ROW}$ which is the time for the accurate read-out of a row of the ROI, the clock signal CLK for the entire array is pulsed (rise and fall), which moves the pointers of the pixels that must be connected to the respective columns in the row to one row below. This process is repeated the number of times equal to the height of the ROIs in pixels detected in the fast read-out mode.

Figure 29:
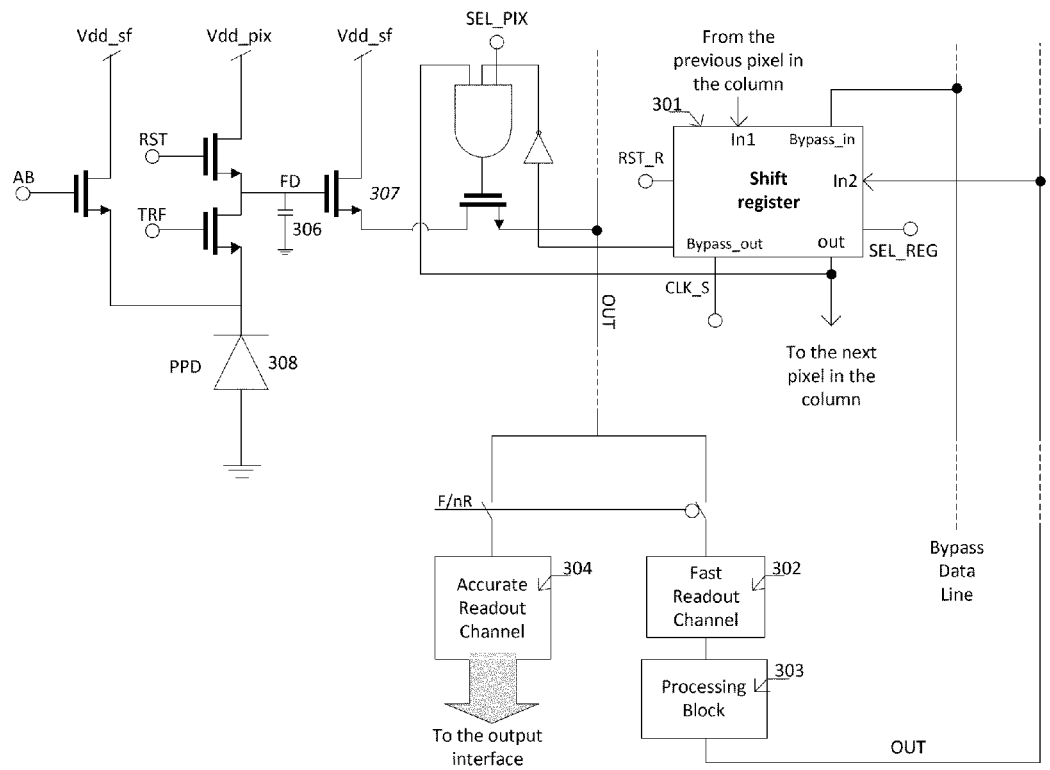
FIG. 29 is a circuit diagram illustrating an example of a pixel architecture supporting multiple ROIs per column.

Another extension of this embodiment of the present invention allows defining and reading out multiple ROIs per column. In such a case the shift register 2210 in FIG. 22 will have a second input called "bypass_in" and one new output called "bypass_out" as shown in FIG. 29. The bypass_in input is set to logic "1" during the ROI programming (as described already with reference to FIGS. 11 and 13) for the pixels in each column which are placed between ROIs to configure the shift-register 2910 in bypass so that any value received at its input "In1" is immediately transferred to its output "out".

In this way, when the shift register 2910 in bypass-mode receives logic "1" during the ROI read-out, it automatically passes to the next shift-register, and this process continues until it reaches the next row's shift-register in the column, which is not in the bypass mode. At this point the ROI read-out continues normally as described above. Finally, the value "bypass_in" is mapped into "bypass_out", negated and connected as a third input of the logic AND gate present in the pixel so that bypassed pixels never connect to the output line, even when the SEL signal is set to logic "1".

In summary, the sensor array circuitry advantageously includes the shift register with a bypass storage means for storing a bypass indication for a pixel indicating by a predefined value that said pixel is to be skipped during reading-out; an input for receiving a bypass signal corresponding to the bypass indication, and the shift register is configured to transfer the signal from its selected input to its output upon receiving the bypass signal with the predefined value.

In accordance with another embodiment of the invention, a method is provided for determining a region of interest, ROI, within pixels of a sensor array, the ROI including one or more pixels to be read-out in a second read-out step from the sensor array, the method comprising the following steps performed for one pixel: first reading-out pixels from the sensor array faster than the second read-out step, and processing for determining whether the pixel read-out by the first reading-out step belongs or not to the ROI based on the read-out pixel value.

Figure 30:
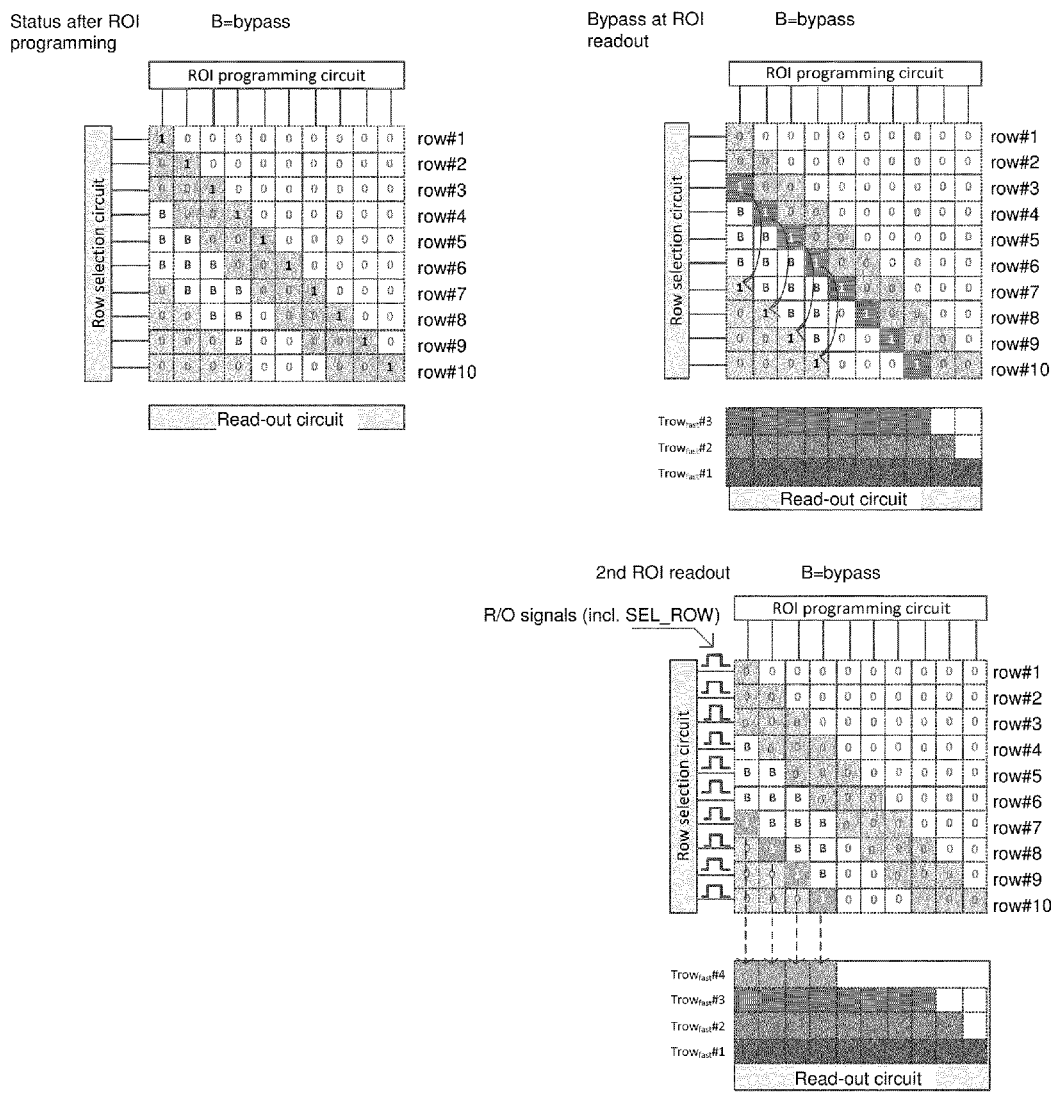
FIG. 30 is a schematic drawing illustrating steps of a ROI configuration and reading out for the architecture of FIG. 29.

FIG. 30 illustrates some processing steps for the embodiment supporting multiple ROIs per column, similar to the processing steps shown in FIG. 12 for another size of the second ROI. In particular, the top left part of FIG. 30 shows the situation after the ROI determination and programming. In particular, there are two ROIs. The ROI storage stores the first pixel in each column and the count (size in pixels) of the first ROI per column or per image. The pixels between the first and the second ROI are marked by "B" meaning that they are to be bypassed when reading-out the respective columns. The second region of interest is then located at the first position not marked as to be bypassed.

The top right part of FIG. 30 shows the bypassing of the pixels marked as to be bypassed when reading the respective columns of the sensor array. When reading out, the first not bypassed pixel in each column after the bypass is recognized as a pixel belonging to the second ROI, and, accordingly, the shift register copies to this pixel the value "1" indicating that the pixel belongs to the ROI after having read-out the first ROI including the three ROI rows.

The bottom part of FIG. 30 illustrates the first row of the second row being readout. Note that even this ROI has fewer columns, reading them out takes the same time as to readout a full row. second ROI consisting of a single ROI row when read-out.

Accordingly, a method is provided for reading out pixels from a region of interest, ROI, within pixels of a sensor array, the ROI including one or more pixels, the method comprising the steps of determining the ROI according to claim 13 for all pixels in the sensor array including the steps of the first reading-out of the pixels and their processing; storing an information identifying the ROI determined; and based on the stored information a second reading-out step for reading out only pixels belonging to the ROI identified by the stored information.

Figure 31:
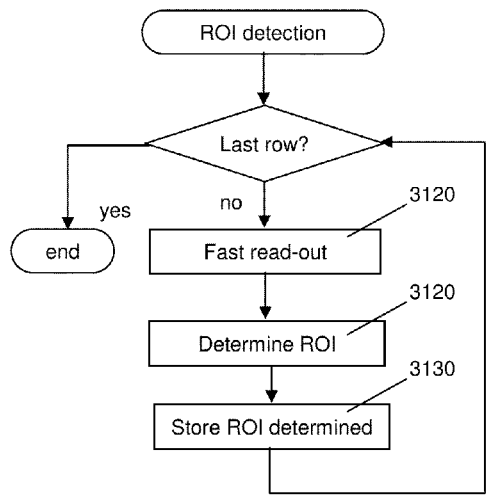
FIG. 31 is a flow diagram illustrating the ROI determination according to an embodiment of the present invention.

The steps of first reading-out, processing, and storing may be performed for one line of pixels at least partially in parallel. FIG. 31 illustrates a flow diagram of a ROI determination in accordance with an embodiment of the present invention. Accordingly for each row, the fast read-out 3120 is performed to obtain an approximate pixel value integrated in the analogue storage FD. The read-out values are processed 3120 to determine whether they belong to ROI or not and the result is stored 3130. As described above, the flow chart does not have to process each row completely by all steps 3110 to 3130. It may process some rows in parallel by the three steps.

It is to be noted that the ROI determining approach may be used irrespectively of the following ROI writing and ROI reading-out approaches. Moreover, the ROI programming and reading-out may work independently of the particular ROI determination approach. The ROI may even be pre-defined or determined in another way as described above. Moreover, the determining may be performed for each frame but it does not need to be performed for each frame this is mainly given by the requirements of the application. For instance, the ROI updating may be performed each M frames wherein M is an integer from 1 to the number of frames in the sequence of frames. The examples described with reference to the figures refer to the architecture where rows are selected and columns are read-out row by row. However, this may be also exchanged. The term "line" of pixels used in some parts of the description above refers to either of row and column.

Another embodiment of the invention relates to implementation of the above described various embodiments using hardware and software. It is recognized that the various embodiments of the invention may be implemented or performed using computing devices (processors). A computing device or processor may be for instance a general purpose processor, a digital signal processor, application specific integrated circuit, field programmable gate array or another programmable logic device. The various forms of the invention may also be performed or embodied by a combination of these devices.

Summarizing, the present invention relates to reading-out sensor array pixels. In particular, the present invention provides an approach according to which only a region of interest is may be read out from the sensor array, thus leading to substantial time savings.

In order to achieve this, in accordance with an embodiment of the invention, a circuitry for configuring a region of interest for the sensor array is provided as well as a reading-out circuitry for reading-out pixels belonging to the region of interest. In addition, the corresponding methods for programming the region of interest and for reading-out the region of interest are provided.

The circuitry for programming and/or reading-out the region of interest includes per pixel provided storage elements for storing an indication of whether a pixel belongs to a region of interest (ROI). These are configured by the programming circuitry and using when reading-out the ROI for only reading out the pixels of the ROI.

In accordance with another embodiment of the present invention, a circuitry is provided for automatic determining of a ROI and reading out the ROI from the sensor array. The circuitry includes a fast reading-out circuitry which is less precise but faster than the accurate reading-out circuitry for reading-out the pixels of the sensor array. The fast reading-out circuitry reads out the pixels with low-level precision and determines by the processing of the fast read-out pixels the ROI which is then provided to a ROI programming circuit for storing the ROI identification and by means thereof to the accurate reading-out circuit which then reads out only the pixels determined to belong to the ROI. The accurate read-out circuit is slower than the fast read-out circuit.

The invention claimed is:

1. A circuitry adaptively configuring a region of interest, ROI, within pixels of a sensor array, the ROI including one or more pixels to be read-out from the sensor array, the circuitry comprising:
a rewritable ROI memory storing a ROI indication indicating that a pixel belongs to the region of interest of the sensor array, the rewritable ROI memory being different from the pixels being read-out; and
a controller writing into the rewritable ROI memory of the pixel the ROI indication,
wherein the rewritable ROI memory is a one-bit memory provided per pixel and having an input receiving a ROI writing signal and an input receiving a ROI configuration signal from the controller;
the controller comprises:
a selection circuit generating the ROI write signal; and
a ROI programming circuit generating the ROI configuration signal;
wherein the rewritable ROI memory is configured to store a ROI configuration signal value upon receiving the ROI writing signal and the rewritable ROI memory is configured to store a first value when the pixel is a first pixel belonging to ROI within a line of pixels and to store a second value, different from the first value otherwise.

2. An integrated circuit implementing the circuitry of claim 1.

3. The circuitry according to claim 1 wherein the controller writes into the rewritable ROI memory the ROI indication in accordance with a value previously read-out from said pixel.

4. A read-out circuitry for reading-out from a sensor array a programmable region of interest, ROI, including one or more pixels, comprising:
a signal storage storing per pixel a signal detected by the sensor;
a rewritable ROI memory provided per pixel storing a ROI indication indicating that the pixel belongs to the region of interest of the sensor array;
a selection circuit selecting at least one pixel to be read-out, the selection circuit being configured to select only pixels with the ROI indication indicating that said pixels belong to the region of interest; and
a read-out circuit reading-out the signal storage of pixels selected.

5. The circuitry according to claim 4, further comprising a shift register including
an input receiving a signal from a rewritable ROI memory of another pixel preceding said pixel within a line of pixels;
an input receiving a signal from the rewritable ROI memory; and
an output shifting a signal received to the rewritable ROI memory of another pixel following said pixel within the line of pixels and to the selection circuit,
wherein the selection circuit is configured to select the pixels in accordance with the signal input from the shift register,
wherein the rewritable ROI memory is configured to store a first value when the pixel is a first pixel belonging to ROI within a line of pixels and to store a second value, different from the first value otherwise, and
wherein the shift register is configured to perform the shifting a predetermined number of times.

6. The circuitry according to claim 5, wherein the circuitry further comprises a bypass storage storing a bypass indication for a pixel indicating by a predefined value that said pixel is to be skipped during reading-out,
wherein the shift register includes an input receiving a bypass signal corresponding to the bypass indication; and
wherein the shift register is configured to transfer the signal from a rewritable ROI memory of the previous pixel to the output upon receiving the bypass signal with the predefined value.

7. An apparatus for image sensing comprising:
the read-out circuitry according to claim 4 connectable to a sensor array matrix including a plurality of pixels;
the circuitry according to claim 1 for configuring a region of interest, ROI, within the sensor array matrix;
write data lines connecting pixels of the sensor array matrix with the circuitry configuring ROI, and
selection lines connecting pixels of the sensor array matrix with the selection circuit; and
signal data lines connecting pixels of the sensor array matrix with the read-out circuitry.

8. An apparatus for triangulation including:
a light source irradiating an object by a laser beam; and
the apparatus according to claim 7 for sensing the light reflected from the irradiated object.

9. A circuitry adaptively configuring a region of interest, ROI, within pixels of a sensor array, the ROI including one or more pixels to be read-out from the sensor array, the circuitry comprising:
  a rewritable ROI memory storing a ROI indication indicating that a pixel belongs to the region of interest of the sensor array, the rewritable ROI memory being different from the pixels being read-out; and
a controller writing into the rewritable ROI memory of the pixel the ROI indication,
  wherein the ROI indication is one bit long,
  wherein the ROI indication takes a first value for the first pixel in a column of the sensor array which belongs to the region of interest and a value different from the first value for all other pixels in said column, and
  wherein the circuitry comprises a counter storage storing an indicator of the number of pixels in said column belonging to ROI.

10. The circuitry according to claim 9, wherein the counter storage is adapted to store the indicator of the number of pixels in the column belonging to ROI for each column separately or commonly for all columns of the sensor area.

11. A method for adaptively configuring a region of interest, ROI, within pixels of a sensor array, the ROI including one or more pixels to be read-out from the sensor array, comprising the following steps performed for one pixel:
  generating a ROI write signal and providing the generated ROI write signal to the pixel,
  upon receiving the ROI writing signal, writing into a rewritable ROI memory of the pixel a ROI indication indicating that a pixel belongs to the region of interest of the sensor array;
  providing the rewritable ROI memory as a one-bit memory provided per pixel;
  receiving, at an input, a ROI writing signal and an input receiving a ROI configuration signal from the controller;
  generating the ROI write signal with a selection circuit of the controller;
  generating the ROI configuration signal with a ROI programming circuit of the controller;
  configuring the rewritable ROI memory to store a ROI configuration signal value upon receiving the ROI write signal;
  storing, in the rewritable ROI memory, a first value when the pixel is a first pixel belonging to ROI within a line of pixels; and
  storing, in the rewritable ROI memory, a second value, different from the first value otherwise.

12. A method for reading-out from a sensor array a region of interest, ROI, including one or more pixels, comprising the steps of:
  selecting at least one pixel to be read-out by selecting only pixels with a predefined value of a ROI indication stored per pixel in a rewritable ROI memory and indicating that said pixel belongs to the region of interest of the sensor array; and
  reading-out a signal from the selected pixels.

13. A method according to claim 12 comprising:
  first reading-out from each column the first pixel belonging to the region of interest,
  shifting the ROI indication values of the pixels read-out to the respective pixels following the read-out pixels in their respective columns thus extending the region of interest, wherein the shifting is performed a predetermined number of times,
  storing for each read-out pixel the ROI indication values of the respective pixels preceding the read-out pixels in their respective columns, and
  second reading-out from each column the first pixel belonging to the redefined region of interest.

14. The method of claim 13, further comprising:
  determining a bypass signal for a pixel, specifying by a predefined value that said pixel is to be skipped during reading-out; and
  transferring the signal from the rewritable ROI memory of the previous pixel to the output upon detecting the bypass signal with a predefined value.

15. The method according to claim 12 comprising:
  sensing with all pixels of the sensor array at the same time for a predefined exposure time period;
  reading-out sequentially portions of the region of interest including respectively i-th pixel belonging to the region of interest in each of the sensor array columns, i being an integer from 1 to N, N being an integer denoting the number of pixels in a column belonging to the region of interest.

* * * * *